(12) United States Patent
Hosoda et al.

(10) Patent No.: US 10,251,004 B2
(45) Date of Patent: Apr. 2, 2019

(54) SOUND DISTRIBUTION APPARATUS, SOUND REPRODUCTION TERMINAL, AUTHENTICATION DEVICE, SOUND DISTRIBUTION SYSTEM, AND SOUND DISTRIBUTION METHOD

(71) Applicant: SONY CORPORATION, Tokyo (JP)

(72) Inventors: Yasuhide Hosoda, Kanagawa (JP); Shigeki Ohno, Kanagawa (JP); Tetsuro Tsuji, Tokyo (JP); Takashi Nakanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,809

(22) PCT Filed: Apr. 28, 2016

(86) PCT No.: PCT/JP2016/063468
§ 371 (c)(1),
(2) Date: Jan. 4, 2018

(87) PCT Pub. No.: WO2017/010145
PCT Pub. Date: Jan. 19, 2017

(65) Prior Publication Data
US 2018/0199143 A1    Jul. 12, 2018

(30) Foreign Application Priority Data

Jul. 13, 2015   (JP) .................. 2015-140038

(51) Int. Cl.
*H04R 27/00*      (2006.01)
*G10K 15/02*      (2006.01)
(Continued)

(52) U.S. Cl.
CPC ........... *H04R 27/00* (2013.01); *G06F 3/0482* (2013.01); *G06F 3/04817* (2013.01);
(Continued)

(58) Field of Classification Search
CPC ......... H04R 27/00; H04R 3/12; H04L 9/3234; G06F 3/04817; G06F 3/0482; G06F 3/165; G10L 19/00
See application file for complete search history.

(56) References Cited

U.S. PATENT DOCUMENTS

2014/0317673 A1   10/2014  Murugan
2018/0068094 A1*   3/2018  Britt, Jr. ................. G11B 27/10

FOREIGN PATENT DOCUMENTS

CN    104272759 A    1/2015
EP      2781106 A2   9/2014
(Continued)

OTHER PUBLICATIONS

Akazawa, et al., "Communication Support Using Animation for Remote Music Performance", Information Processing Society of Japan, 2013, pp. 234-237.
(Continued)

*Primary Examiner* — Andrew L Sniezek
(74) *Attorney, Agent, or Firm* — Chip Law Group

(57) ABSTRACT

[Object] To enable simply viewing of a performance even at a location away from a hall where the performance takes place. [Solution] A sound distribution apparatus is connected to a sound reproduction terminal that detachably holds an authentication device storing decoding information, the sound distribution apparatus including: a sound distribution unit configured to streaming-distribute sound information, which has been encrypted with a decodable code on the basis of the decoding information, to the sound reproduction terminal.

18 Claims, 16 Drawing Sheets

(51) Int. Cl.
  *G10L 19/00* (2013.01)
  *H04L 9/32* (2006.01)
  *G06F 3/0481* (2013.01)
  *G06F 3/0482* (2013.01)
  *G06F 3/16* (2006.01)
  *H04R 3/12* (2006.01)
  *G06F 21/10* (2013.01)

(52) U.S. Cl.
  CPC .............. *G06F 3/165* (2013.01); *G06F 21/10* (2013.01); *G10K 15/02* (2013.01); *G10L 19/00* (2013.01); *H04L 9/3226* (2013.01); *H04L 9/3234* (2013.01); *H04R 3/12* (2013.01)

(56) References Cited

FOREIGN PATENT DOCUMENTS

| | | | |
|---|---|---|---|
| JP | 2004-062812 A | 2/2004 | |
| JP | 2004-072423 A | 3/2004 | |
| JP | 2005-339479 A | 12/2005 | |
| JP | 2015-507855 A | 3/2015 | |
| KR | 10-2014-0125760 A | 10/2014 | |
| WO | 02/069639 A1 | 9/2002 | |
| WO | 2002/069639 A1 | 9/2002 | |
| WO | 2013/072879 A2 | 5/2013 | |

OTHER PUBLICATIONS

Akazawa, et al., "Communication Support Using Animation for Remote Music Performance", 2013 Information Processing Society of Japan, Oct. 2013, pp. 234-237.

Akazawa, et al., "Communication support using animation for remote music performance", Information Processing Society of Japan Symposium Entertainment Computing Symposium, Sep. 27, 2013, pp. 234-237.

International Search Report and Written Opinion of PCT Application No. PCT/JP2016/063468, dated Jul. 19, 2016, 9 pages of ISRWO.

* cited by examiner

SOUND DISTRIBUTION APPARATUS, SOUND REPRODUCTION TERMINAL, AUTHENTICATION DEVICE, SOUND DISTRIBUTION SYSTEM, AND SOUND DISTRIBUTION METHOD

CROSS REFERENCE TO RELATED APPLICATIONS

This application is a U.S. National Phase of International Patent Application No. PCT/JP2016/063468 filed on Apr. 28, 2016, which claims priority benefit of Japanese Patent Application No. JP 2015-140038 filed in the Japan Patent Office on Jul. 13, 2015. Each of the above-referenced applications is hereby incorporated herein by reference in its entirety.

TECHNICAL FIELD

The present disclosure relates to a sound distribution apparatus, a sound reproduction terminal, an authentication device, a sound distribution system, and a sound distribution method.

BACKGROUND ART

In recent years, performers such as artists have presented performances (so-called concerts and live performances) at halls at various locations.

For such performances, the number of viewers who can view the performances is limited since the number of people that the halls of the performances can accommodate is limited. Therefore, some of fans of the performers who hope to view the performances cannot get tickets and view the performances in some cases. Also, it is necessary to visit the halls of the performances in order to view the performances. Therefore, it is difficult for fans of the performers who live far from the halls to view the performances.

Here, distribution of video images of concerts and sports to various information terminals via networks, for example, in real time has been considered as is disclosed in the following Patent Literature 1.

CITATION LIST

Patent Literature

Patent Literature 1: JP 2005-339479A

DISCLOSURE OF INVENTION

Technical Problem

However, user authentication or the like is not performed on users who view a video distributed in real time according to the technology disclosed in the aforementioned Patent Literature 1. Therefore, since anyone can view the distributed video, it is difficult to collect payment for the performance from the users who view the video. Also, in a case in which only registered users can view the video, the users are required to perform a complicated registration process, which degrades convenience for the users.

Thus, the present disclosure proposes a novel and improved sound distribution apparatus, sound reproduction terminal, authentication device, sound distribution system, and sound distribution method enabling a user to simply view a performance even at a location away from a hall where the performance takes place.

Solution to Problem

According to the present disclosure, there is provided a sound distribution apparatus that is connected to a sound reproduction terminal that detachably holds an authentication device storing decoding information, the sound distribution apparatus including a sound distribution unit configured to streaming-distribute sound information, which has been encrypted with a decodable code on the basis of the decoding information, to the sound reproduction terminal.

In addition, according to the present disclosure, there is provided a sound reproduction terminal that is connected to a sound distribution apparatus that streaming-distributes encrypted sound information, the sound reproduction terminal including: a device attachment unit configured to detachably hold an authentication device storing decoding information for decoding the encrypted sound information; a decoding unit configured to decode the encrypted sound information on the basis of the decoding information acquired from the authentication device; and a sound reproduction unit configured to streaming-reproduce the decoded sound information.

In addition, according to the present disclosure, there is provided an authentication device that stores decoding information for decoding sound information that is streaming-distributed from a sound distribution apparatus, is the authentication device being detachably held by a sound reproduction terminal that streaming-reproduces the decoded sound information.

In addition, according to the present disclosure, there is provided a sound distribution system including: a sound reproduction terminal including a device attachment unit configured to detachably hold an authentication device storing decoding information for decoding encrypted sound information, a decoding unit configured to decode the encrypted sound information on the basis of the decoding information acquired from the authentication device, and a sound reproduction unit configured to streaming-reproduce the decoded sound information; and a sound distribution apparatus including a sound distribution unit configured to streaming-distribute the encrypted sound information to the sound reproduction terminal.

In addition, according to the present disclosure, there is provided a sound distribution method including: connecting to a sound reproduction terminal configured to detachably hold an authentication device storing decoding information; encrypting sound information with a decodable code on the basis of the decoding information stored in the authentication device by using an arithmetic processing device; and streaming-distributing the encrypted sound information to the sound reproduction terminal.

According to the present disclosure, it is possible to limit users who can listen to sound to users who have authentication devices storing decoding information by encrypting and streaming-distributing sound information.

Advantageous Effects of Invention

According to the present disclosure, the users can easily view the performance even at a location away from a hall where the performance takes place as described above.

Note that the effects described above are not necessarily limitative. With or in the place of the above effects, there

MODE(S) FOR CARRYING OUT THE INVENTION

Figure 1:
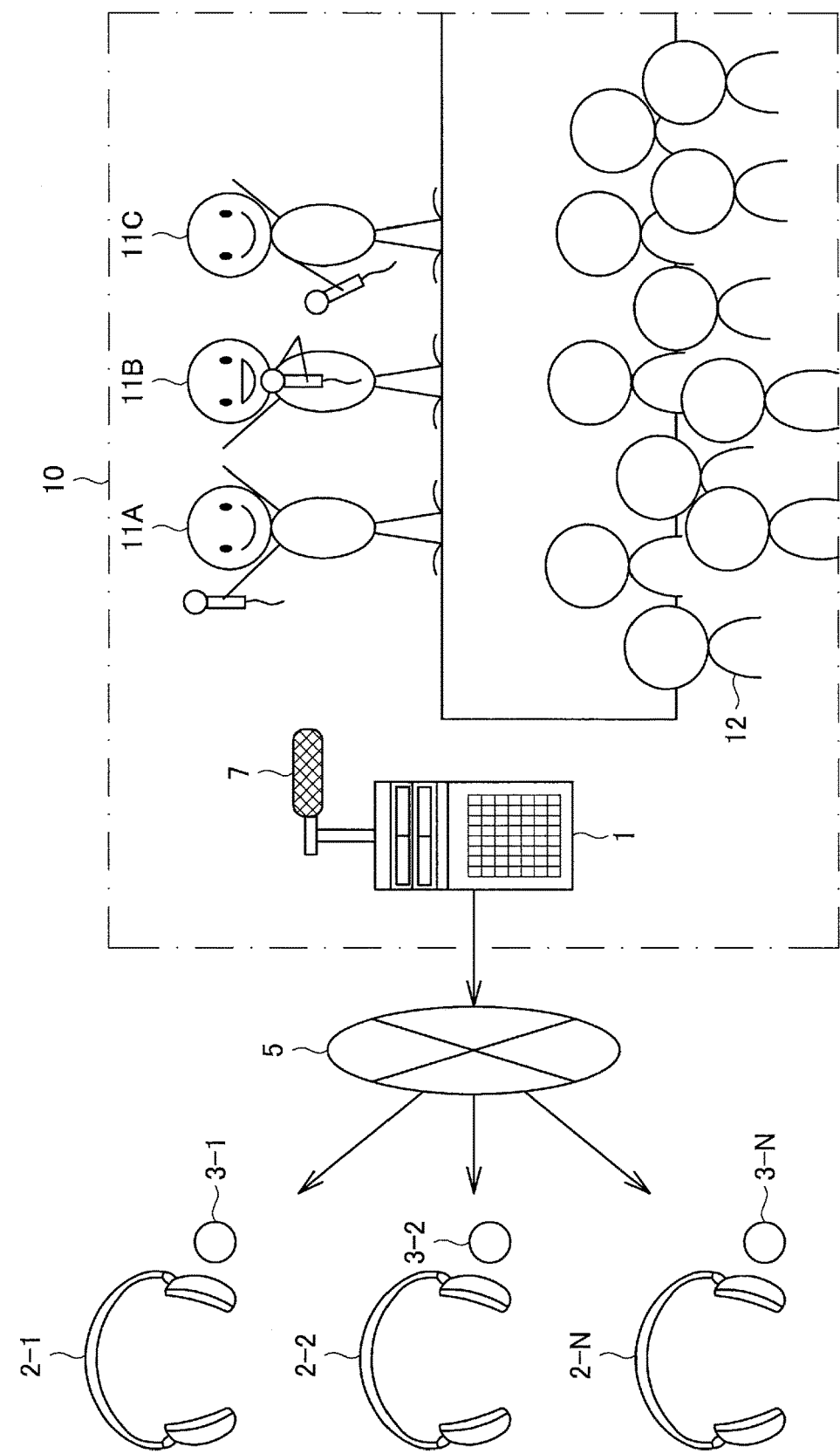
FIG. 1 is a diagram schematically illustrating an outline of a sound distribution system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.

1. First embodiment
1.1 Outline of sound distribution system
1.2 Configuration example of sound distribution system
1.3 Operation example of sound distribution system
1.4 Modification example
2. Second embodiment
2.1 Configuration example of sound distribution system
2.2 Operation example of sound distribution system
3. Third embodiment
3.1 Configuration example of sound distribution system
3.2 Operation examples of sound distribution system
3.2.1 First operation example
3.2.2 Second operation example
3.2.3 Third operation example
3.2.4 Fourth operation example
4. Hardware configuration
5. Conclusion

1. First Embodiment

1.1 Outline of Sound Distribution System

First, an outline of a sound distribution system according to a first embodiment of the present disclosure will be described with reference to FIG. 1. FIG. 1 is a diagram schematically illustrating an outline of the sound distribution system according to the embodiment.

As illustrated in FIG. 1, the sound distribution system according to the embodiment includes sound reproduction terminals 2-1 to 2-N (also referred to as a sound reproduction terminal 2 without distinction) to which authentication devices 3-1 to 3-N (also referred to as an authentication device 3 without distinction) are attached and a sound distribution apparatus 1 connected to the sound reproduction terminals 2-1 to 2-N via a network 5.

The sound distribution system according to the embodiment acquires sound of a performance done by performers 11A to 11C (also collectively referred to as a performer 11) at a hall 10 by a microphone 7 and streaming-distributes the sound to the respective sound reproduction terminals 2-1 to 2-N via the network 5. In this manner, the sound distribution system enables fans of the performers 11A to 11C who cannot visit the hall 10 of the performance to view the performance and can provide the same realistic sensations and special feeling as those of an audience 12 at the hall 10.

The streaming-distribution (hereinafter, also simply referred to as distribution) means that content data is split into small pieces and is distributed such that the sound reproduction terminal 2 can successively reproduce the content data while receiving the content data. It is possible to view a video or sound collected at the hall 10 immediately (in real time) by such a distribution method.

In the sound distribution system according to the embodiment, sound information of a performance that is streaming-distributed by the sound distribution apparatus 1 is encrypted, and decoding information for decoding the code is stored in the authentication devices 3-1 to 3-N. In this manner, the encrypted sound information can be decoded for only the users who have the authentication devices 3-1 to 3-N such that only those users can view the performance according to the sound distribution system.

Here, the performer 11 is a singer such as an artist or a pop idol or a musician such as a band member. It is needless to say that the performer 11 may be one person. Also, the hall 10 is a space where the performance takes place, and examples thereof include a recording studio, a live house, a concert hall, an event hall, and a multi-purpose arena.

Further, the audience 12 is viewers who visit the hall 10 where the performance such as a live show or a concert takes place.

The performance done by the performer 11 may be a performance dedicated for streaming-distribution. In such a case, no audience 12 may be present.

A microphone 7 is audio equipment that corrects sound of the performance done by each of the performers 11A to 11C and sound in the hall 10, such as cheers of the audience 12 and converts the sound into sound information. A plurality of microphones 7 may be installed at the hall 10 and may include handheld microphones that the respective performers 11A to 11C hold.

The sound distribution apparatus 1 is an information processing server, for example, that converts the sound of the performance done by the performer 11 and the sound in the hall 10 into sound information and streaming-distributes the sound information to the respective sound reproduction terminals 2-1 to 2-N. Specifically, the sound distribution apparatus 1 collects the sound of the performance done by the performer 1 and the sound in the hall 10 by using the microphone 7, encrypts the collected sound information, and then streaming-distributes the encrypted sound information to the respective sound reproduction terminals 2-1 to 2-N via the network 5.

The network 5 is a communication network that connects the sound distribution apparatus 1 to the respective sound reproduction terminals 2-1 to 2-N to enable transmission and reception of information. The network 5 is a public line network such as the Internet, a satellite communication network, a telephone line network, or a mobile body communication network (a 3G line network, for example).

The sound reproduction terminals 2-1 to 2-N are sound reproduction terminals such as headsets or speakers and streaming-reproduce sound information distributed from the sound distribution apparatus 1. Specifically, the sound reproduction terminal 2 reads decoding information from the authentication device 3 attached to the sound reproduction terminal 2. The sound reproduction terminal 2 decodes the sound information, which has been encrypted and distributed by the sound distribution apparatus 1, on the basis of the read decoding information and streaming-reproduces the decoded sound information.

The authentication devices 3-1 to 3-N are media, such as cards or medals, in which integrated circuit (IC) chips storing decoding information are embedded. Specifically, the authentication devices 3-1 to 3-N may be media in which subscriber identity module (SIM) cards for mobile phones are embedded. In a case in which the authentication device 3 is attached to the sound reproduction terminal 2, the decoding information stored in the authentication device 3 is read by the sound reproduction terminal 2.

According to such a sound distribution system, the user can view the performance, which is being presented by the performer 11 in the hall 10, at a location away from the hall 10 in real time. Since the distributed sound information is encrypted in the sound distribution system according to the embodiment, it is possible to limit users who can listen to the sound information to users who have the authentication devices 3 storing the decoding information. Therefore, the sound distribution system according to the embodiment can collect payment for the viewing of the performance from the users by selling the authentication devices 3 to the users.

The authentication devices 3 may be sold and shipped to the users through the same distribution routes as those of tickets for live performances and concerts, for example. Specifically, ticket companies and the like who receive requests from users who hope to view the performance by using the sound reproduction terminals 2 may sell the authentication devices 3 for the users and ship the sold authentication devices 3 to the users. Also, the authentication devices 3 may be sold as event goods at other halls where the performance done by the performer 11 takes place.

A name, a photo, and an emblem, for example, of the performer 11 may be printed on case bodies of the sound reproduction terminals 2 and the authentication devices 3. It is possible to improve values of the sound reproduction terminals 2 and the authentication devices 3 as fan goods, event goods, and souvenirs by providing such design to the case bodies of the sound reproduction terminals 2 and the authentication devices 3. Such sound reproduction terminals 2 and the authentication devices 3 may be sold at the hall 10 where the performance done by the performer 11 takes place, for example.

In a case in which a plurality of performers 11 present a performance as illustrated in FIG. 1, different names, photos, and emblems of the performers 11 may be printed on the respective case bodies of the sound reproduction terminals 2 and the authentication devices 3. For example, values of the sound reproduction terminals 3 and the authentication devices 3 in the case bodies, on which the name, the photo, the emblems, and the like of a favorite performer 11 are printed, as fan goods are further improved for the users who have especially favorite performers 11 from among the plurality of performers 11. This configuration is preferable since it is possible to further improve the values of the sound reproduction terminals 2 and the authentication devices 3 as fan goods, event goods, and souvenirs.

1.2 Configuration Example of Sound Distribution System

Figure 2:
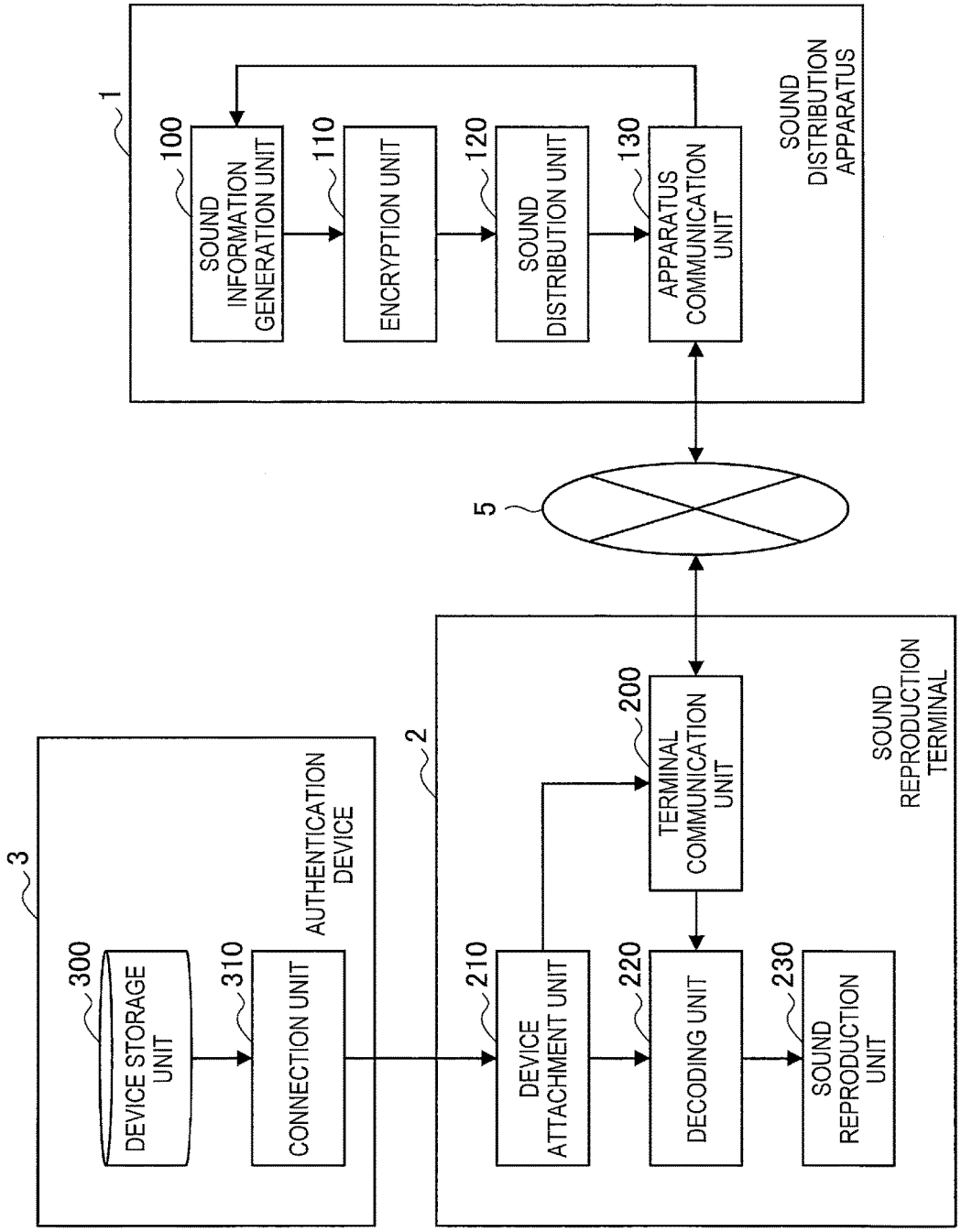
FIG. 2 is a block diagram illustrating a functional configuration of the sound distribution system according to the embodiment.

Next, a specific configuration example of the sound distribution system according to the embodiment will be described with reference to FIG. 2. FIG. 2 is a block diagram illustrating a functional configuration of the sound distribution system according to the embodiment.

As illustrated in FIG. 2, the sound distribution system according to the embodiment includes the sound distribution apparatus 1, the sound reproduction terminal 2 that is connected to the sound distribution apparatus 1 via the network 5, and the authentication device 3 that is attached to the sound reproduction terminal 2. Also, the sound distribution apparatus 1 includes a sound information generation unit 100, an encryption unit 110, a sound distribution unit 120, and an apparatus communication unit 130, the sound reproduction terminal 2 includes a terminal communication unit 200 and a device attachment unit 210, a decoding unit 220, a sound reproduction unit 230, and the authentication device 3 includes a device storage unit 300 and a connection unit 310.

(Sound Distribution Apparatus 1)

The sound information generation unit 100 generates sound information to be distributed to the sound reproduction terminal 2. Specifically, the sound information generation unit 100 collects sound of a performance by the microphone 7 that is installed at each location in the hall 10 where the performance takes place, and generates sound information to be distributed to the sound reproduction terminal 2 on the basis of the collected sound. For example, the sound information generation unit 100 generates the sound information by appropriately adjusting and mixing the sound collected by each microphone 7 such that the sound information is optimal for viewing by the sound reproduction terminal 2. For example, the sound information generation unit 100 may generate the sound information by reducing a rate of sound of the audience 12 at the hall 10 such that the sound of the performance done by the performer 11 can be more clearly heard. Also, the sound information generation unit 100 may generate the sound information by raising the rate of the sound of the audience 12 at the hall 10 in order to further enhance realistic sensations at the hall 10.

Here, the sound of the performance is a song and music presented by the performer 11 and the cheers of the audience 12, for example. However, the sound information generated by the sound information generation unit 100 may not include the sound of the performance. For example, the sound information generation unit 100 may collect sound (chattering voices of the audience 12, an announcement sound provided at the hall 10, and the like) of the hall 10 before the start of the performance or after the end of the performance and generate the sound information including the collected sound. Such a configuration can further enhance realistic sensations of the user before the start of the performance or after the end of the performance.

Also, the sound information generation unit 100 may generate different sound information for each sound reproduction terminal 2. Specifically, the sound information generation unit 100 may receive device identification information from the sound reproduction terminal 2 and generate sound information with a mixing configuration changed on the basis of the device identification information.

In a case in which there are a plurality of performers 11, and authentication devices 3 are provided to correspond to the respective performers 11, for example, the sound information generation unit 100 may generate sound information mainly including the sound of the respective performers 11. Specifically, the sound information generation unit 100 may determine the performer 11 to whom the authentication device 3 attached to the sound reproduction terminal 2 corresponds, on the basis of the received device identification information and generate sound information that mainly includes the sound of the performer 11 corresponding to the authentication device 3 attached to the sound reproduction terminal 2. Since the user can listen to the sound information mainly including the sound of his or her favorite performer 11 in this case, the sound distribution system can improve a satisfaction level of the user.

Furthermore, the sound information generation unit 100 may generate various kinds of sound information in addition to the sound information including the sound of the performance of the performer 11. For example, the sound information generation unit 100 may generate sound information including sound that explains situations of the hall 10, movement of the performer 11, and the like, sound information including sound that gives a commentary on content of the performance, sound information including sound that simultaneously interprets the language spoken by the performer 11 from a foreign country, sound information including sound of master of ceremonies (MC) and a prior notification of an event such as an unexpected incident, sound information including sound that is heard at a specific position in the hall 10 (on a rear side or a front side in the hall 10, on a stage where the performer 11 presents the performance, or the like), and the like. Such sound information may be distributed to the sound reproduction terminal 2 of the user instead of the sound information including the sound of the performance of the performer 11 or in a superimposed manner with the sound information including the sound of the performance, in response to a user selection input from the sound reproduction terminal 2.

The encryption unit 110 encrypts sound information to be distributed to the sound reproduction terminal 2. Specifically, the encryption unit 110 encrypts the sound information generated by the sound information generation unit 100 in a predetermined encryption scheme. A known coding scheme can be used as the scheme of encryption by the encryption unit 110, and for example, it is possible to use a common key coding scheme such as an advanced encryption standard (AES) or a data encryption standard (DES) or a public key coding scheme such as RSA or elliptic curve cryptography (ECC).

The sound distribution unit 120 streaming-distributes the encrypted sound information to the sound reproduction terminal 2. Specifically, the sound distribution unit 120 converts the encrypted sound information into a data scheme in which the streaming-distribution can be performed, by chronologically dividing the sound information and distributes the sound information to the sound reproduction terminal 2. In this manner, it is possible to successively reproduce (streaming-reproduce) the chronologically received sound information without receiving the entire sound information.

The apparatus communication unit 130 is an interface that transmits the encrypted sound information to the sound reproduction terminal 2 via the network 5. The apparatus communication unit 130 may be any interface as long as it can connect to the network 5. For example, the apparatus communication unit 130 may be an antenna communication device that performs wireless communication by radio waves, a cable communication device that performs wired cable communication, or a communication device that supports wired or wireless LAN.

(Authentication Device 3)

The device storage unit 300 stores decoding information. Specifically, the device storage unit 300 stores decoding information for decoding the code used by the encryption unit 110. In a case in which the code used by the encryption unit 110 is based on the common key coding scheme, for example, the device storage unit 300 stores a common key as the decoding information. In a case in which the code used by the encryption unit 110 is based on the public key coding scheme, the device storage unit 300 stores a secret key, which forms a pair with the public key, as the decoding information. The device storage unit 300 may be a read only memory (ROM) or the like that is embedded in the authentication device 3.

The device storage unit 300 may store device identification information for identifying each authentication device 3 that has been sold. The device identification information is transmitted to the sound distribution apparatus 1 and is used for authentication check by the authentication device 3 or to identify the sound reproduction terminal 2 to which the authentication device 3 is attached, for example.

The connection unit 310 is a connector or an antenna for transmitting information stored in the device storage unit 300 to the device attachment unit 210. In a case in which a reading scheme of the authentication device 3 and the device attachment unit 20 is a contact type, for example, the connection unit 310 may be a connector that can connect to the device attachment unit 210. In a case in which the reading scheme of the authentication device 3 and the device attachment unit 210 is a non-contact type, the connection unit 310 may be an antenna that can connect to the device attachment unit 210.

(Sound Reproduction Terminal 2)

The terminal communication unit 200 is an interface that receives encrypted sound information from the sound distribution apparatus 1 via the network 5. The terminal communication unit 200 may be any interface as long as it can connect to the network 5. For example, the terminal communication unit 200 may be an antenna communication device that performs wireless communication by radio waves, a cable communication device that performs wired cable communication, or a communication device that supports wired or wireless LAN.

The device attachment unit 210 is a reader/writer that includes a slot to which the authentication device 3 is attached, and reads the decoding information stored in the attached authentication device 3. For example, the device attachment unit 210 may be a device drive that reads the decoding information stored in the device storage unit 300 of the authentication device 3 in the contact-type scheme or the non-contact-type scheme.

The device attachment unit 210 may detect whether the authentication device 3 has been attached. According to the configuration, the sound reproduction terminal 2 can interrupt the streaming reproduction in a case in which the authentication device 3 is detached from the sound reproduction terminal 2 during the streaming reproduction. In this manner, it is possible to prevent a situation in which one authentication device is shared by a plurality of sound reproduction terminals 2 and the plurality of sound reproduction terminal 2 can realize the streaming reproduction by using the one authentication device, for example.

The decoding unit 220 decodes the sound information which has been encrypted and then distributed by the sound distribution apparatus 1. Specifically, the decoding unit 220 decodes the sound information, which has been encrypted and then distributed by the sound distribution apparatus 1, on the basis of the decoding information read from the authentication device 3. In a case in which the sound information is encrypted by the common key coding scheme, for example, the decoding unit 220 decodes the sound information by using a common key as the decoding information. In a case in which the sound information is encrypted by the public key coding scheme, the decoding unit 220 decodes the sound information by using a secret key as the decoding information.

The sound reproduction unit 230 streaming-reproduces the sound information. Specifically, the sound reproduction unit 230 streaming-reproduces the sound information that has been decoded by the decoding unit 220. The sound reproduction unit 230 may be a sound generating member, such as a speaker, including a diaphragm for converting the sound information as an electric signal into acoustic waves.

The sound distribution system according to the embodiment described above enables the user to view the performance performed by the performer 11 by using the sound reproduction terminal 2 in real time. Therefore, the sound distribution system according to the embodiment enables the user who cannot visit the hall 10 where the performance takes place to listen to the sound with sound quality that is as high as that in the hall 10 and provides similar realistic sensations to those in the hall 10.

Since the sound information is encrypted and streaming-distributed in the sound distribution system according to the embodiment, it is possible to limit the users who can listen to the sound information to users who have the authentication devices 3 storing the decoding information. Therefore, the sound distribution system according to the embodiment can more simply control the users' viewing of the performance depending on whether or not the users have the authentication devices 3.

Furthermore, the sound reproduction terminal 2 according to the embodiment does not have a connection port that outputs the sound information to the outside, such as a Universal Serial Bus (USB) terminal or an optical audio terminal and a storage medium reader/writer (a so-called drive) capable of writing the sound information in a removable storage medium such as an optical disc, a semiconductor memory, or a flash memory. With this configuration, the sound information distributed by the sound distribution apparatus 1 can be reproduced only by the sound reproduction terminal 2 to which the sound information has been distributed. Therefore, the sound distribution system according to the embodiment can prevent the distributed sound information of the performance from being brought to the outside of the sound distribution system and used improperly. Also, it is needless to say that the sound reproduction terminal 2 can have an input-dedicated terminal that enables external input such as analog input.

1.3 Operation Example of Sound Distribution System

Figure 3:
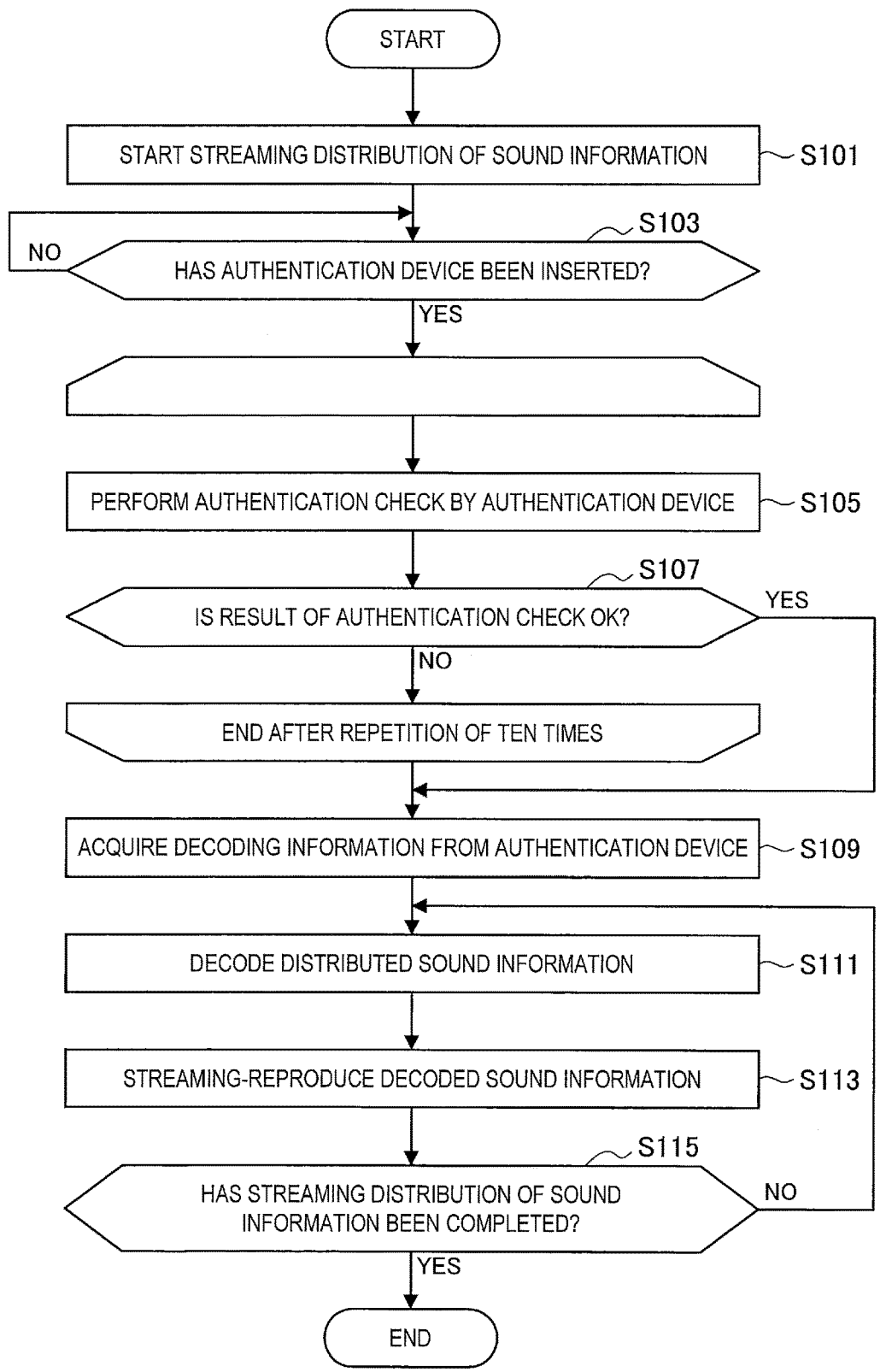
FIG. 3 is a flowchart illustrating an operation example of the sound distribution system according to the embodiment.

Next, an operation example of the sound distribution system according to the embodiment will be described with reference to FIG. 3. FIG. 3 is a flowchart illustrating an operation example of the sound distribution system according to the embodiment. The operation example of the sound distribution system described below is only an example, and operations of the sound distribution system according to the embodiment are not limited to the example illustrated in FIG. 3.

First, the sound distribution apparatus 1 collects sound of the performance of the performer 11 as illustrated in FIG. 3. The collected sound information of the performance is encrypted and is then streaming-distributed by the sound distribution unit 120. In a case in which the streaming distribution of the sound information is started (S101), the device attachment unit 210 of the sound reproduction terminal 2 determines whether or not the authentication device 3 has been attached first (S103). In a case in which the device attachment unit 210 determines that the authentication device 3 has not been attached (S103/N0), the device attachment unit 210 repeatedly executes the determination in S103.

Meanwhile, in a case in which the device attachment unit 210 determines that the authentication device 3 has been attached (S103/Yes), the device attachment unit 210 performs authentication check by the authentication device 3 (S105) and determines whether or not a result of the authentication check is OK (S107). When the result of the authentication check is NG (S107/No), the device attachment unit 210 repeats the authentication check ten times, for example. Here, in a case in which all the results of the authentication check are NG, the sound reproduction terminal 2 determines that the authentication check by the authentication device 3 cannot be performed and completes the operations.

The authentication check by the authentication device 3 may be performed by receiving the device identification information stored in the device storage unit 300 of the authentication device 3 by the sound distribution apparatus 1 and determining whether distribution of the sound information to the device identification information is permitted. Specifically, the sound distribution apparatus 1 maintains, as a list, the device identification information of the authentication devices 3 for which the distribution of the sound information is permitted, and determines whether or not the received device identification information is on the list. In a case in which the received device identification information is on the list, the sound distribution apparatus 1 may determine that the result of the authentication check by the authentication device 3 is OK.

In a case in which the result of the authentication check is OK (S107/Yes), the device attachment unit 210 reads the decoding information from the authentication device 3 (S109). Then, the decoding unit 220 decodes the streaming-distributed sound information on the basis of the read decoding information (S111). Next, the sound reproduction unit 230 successively streaming-reproduces the decoded sound information (S113). Furthermore, the sound reproduction terminal 2 determines whether or not the streaming distribution of the sound information has been completed (S115), and in a case in which the streaming distribution has not been completed (S115/No), the sound reproduction terminal 2 continuously performs the decoding of the sound information (S111) and the streaming reproduction (S113). Meanwhile, in a case in which the streaming distribution has been completed (S115/Yes), the sound reproduction terminal 2 completes the operations.

According to the aforementioned operations, the sound distribution system according to the embodiment can stream-distribute the sound information to the sound reproduction terminals 2 to which the authentication devices 3 are attached and allow only limited users to view the performance of the sound information by using the authentication devices 3 for the authentication. Therefore, the sound distribution system according to the embodiment can more simply control the users' viewing of the performance.

1.4 Modification Example

Next, a sound distribution system according to a modification example of the first embodiment of the present disclosure will be described with reference to FIG. 4. The sound distribution system according to the modification example includes a terminal storage unit 250 in a sound reproduction terminal 2A to allow the user to save a memorable part or a part that the user hopes to save for memory in the received sound information.

Figure 4:
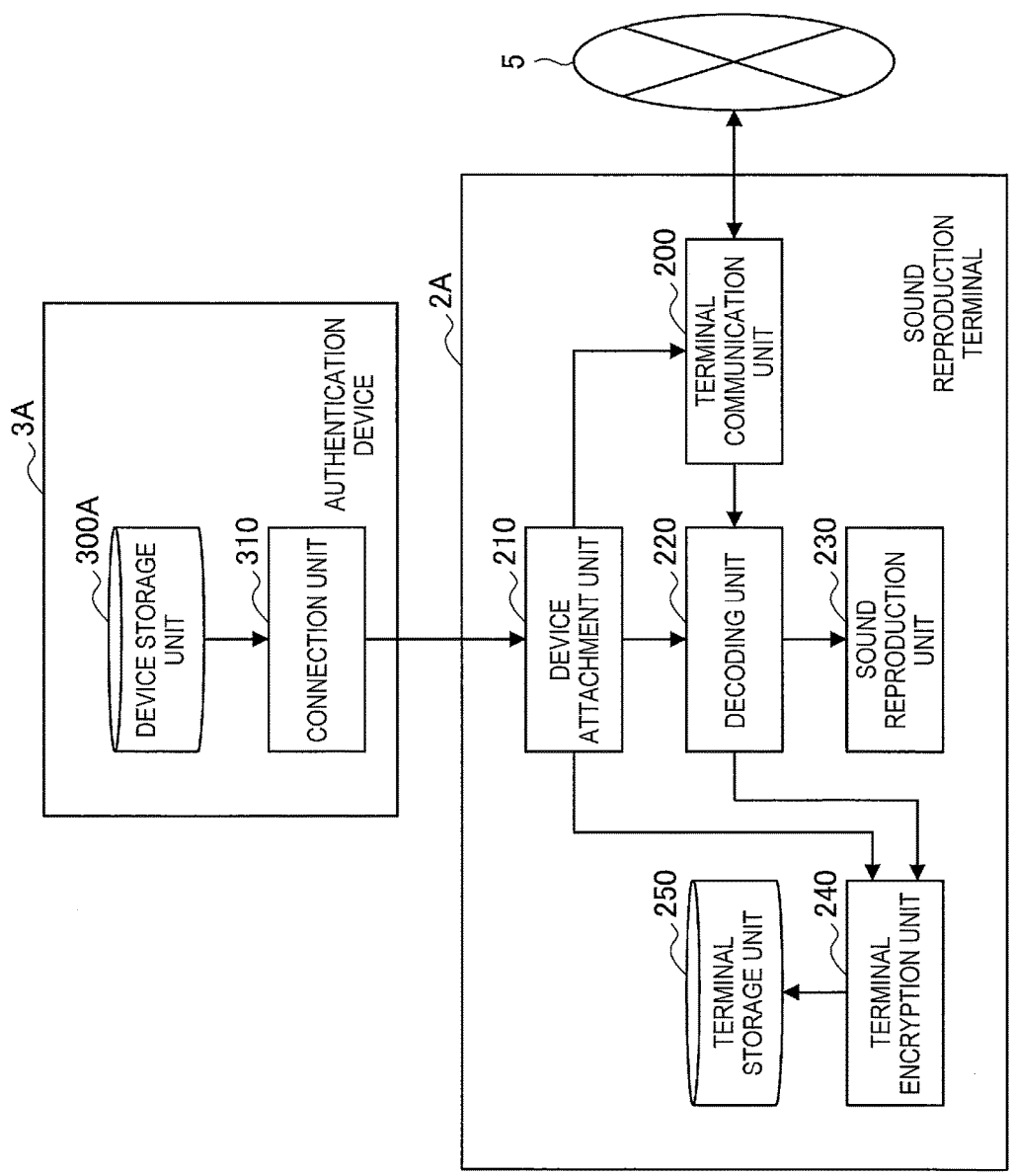
FIG. 4 is a block diagram illustrating functional configurations of a sound reproduction terminal and an authentication device according to a modification example of the first embodiment of the present disclosure.

FIG. 4 is a block diagram illustrating functional configurations of the sound reproduction terminal 2A and an authentication device 3A according to the modification example. Since the functional configuration of the sound distribution apparatus 1 in the sound distribution system according to the modification example is substantially the same as the configuration described with reference to FIG. 2, the description thereof will be omitted here.

As illustrated in FIG. 4, the sound reproduction terminal 2A according to the modification example includes a terminal communication unit 200, a device attachment unit 210, a decoding unit 220, a sound reproduction unit 230, a terminal encryption unit 240, and a terminal storage unit 250, and the authentication device 3A includes a device storage unit 300A and a connection unit 310. In these configurations, the same reference numerals will be given to substantially the same configurations as those described with reference to FIG. 2, and the description thereof will be omitted.

(Authentication Device 3A)

The device storage unit 300A stores encryption information corresponding to the decoding information in addition to the decoding information. In a case in which the sound information is encrypted by the common key coding scheme, for example, the device storage unit 300A stores a common key as the encryption information and the decoding information. In a case in which the sound information is encrypted by the public key coding scheme, the device storage unit 300A stores a public key as the encryption information and stores a secret key, which forms a pair with the public key, as the decoding information. The device storage unit 300A may be a ROM or the like that is embedded in the authentication device 3A.

(Sound Reproduction Terminal 2A)

The terminal encryption unit 240 encrypts a part of distributed sound information on the basis of the encryption information read from the authentication device 3A. Specifically, the terminal encryption unit 240 extracts the sound information that is memorable to the user from the distributed sound information and encrypts the extracted sound information on the basis of the encryption information read from the authentication device 3A.

Here, the sound information which is memorable to the user may be sound information within a range set by an instruction from the user or may be sound information within a range set in advance. In a case in which the range of the sound information is set in accordance with the instruction from the user, a range of the sound information from a timing preceding the timing instructed by the user by predetermined time (about ten seconds, for example) may be set. The sound information which is memorable to the user includes sound information when a special staging arrangement is made in the performance, sound information when an interaction between the user and the performer 11, which will be described later in a third embodiment, occurs, or sound information when the performer 11 calls the audience 12 or the user.

However, the sound information extracted and encrypted by the terminal encryption unit 240 is limited to a part of the distributed sound information (several tens of seconds or about one minute, for example). This is for preventing the stored sound information from being improperly used.

The terminal storage unit 250 stores the encrypted sound information. Specifically, the terminal storage unit 250 stores the sound information that is extracted and encrypted by the terminal encryption unit 24 and is memorable to the user. The terminal storage unit 250 is a known storage device and may be a flash memory, a solid state drive (SSD) device, or a hard disk drive (HDD) device, for example.

According to the configuration described above, the user can extract the memorable sound information from the distributed sound information and store the sound information in the sound reproduction terminal 2A. Therefore, the user can repeatedly listen to the memorable sound information even after the distribution of the sound information is completed. Also, since the sound information stored in the sound reproduction terminal 2A is encrypted by the terminal encryption unit 240, the sound information can be listened to only on the sound reproduction terminal 2A with the authentication device 3A attached thereto, from which the decoding information has been read. Therefore, the sound distribution system according to the modification example can prevent the stored sound information from being improperly used.

2. Second Embodiment

2.1 Configuration Example of Sound Distribution System

Next, a sound distribution system according to a second embodiment of the present disclosure will be described with reference to FIG. 5. The sound distribution system according to the embodiment includes a drive unit 260 in a sound reproduction terminal 2B and further provides realistic sensations with a force sense to a user by a sound distribution apparatus 1 distributing force sense information in addition to sound information.

Figure 5:
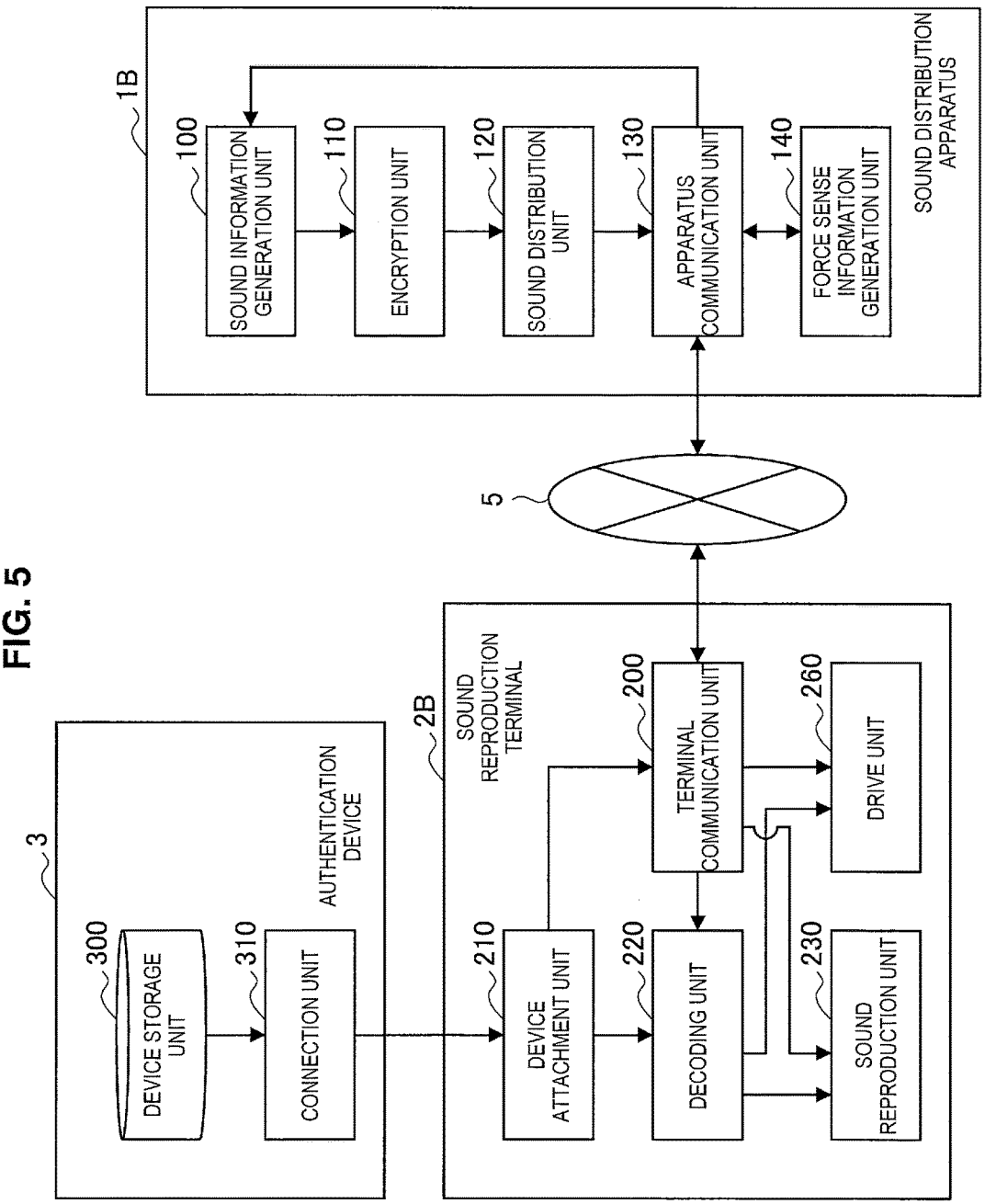
FIG. 5 is a block diagram illustrating a functional configuration of a sound distribution system according to a second embodiment of the present disclosure.

FIG. 5 is a block diagram illustrating a functional configuration of the sound distribution system according to the embodiment. As illustrated in FIG. 5, the sound distribution system according to the embodiment includes the sound distribution apparatus 1B, the sound reproduction terminal 2B that is connected to the sound distribution apparatus 1B via a network 5, and an authentication device 3 that is attached to the sound reproduction terminal 2B. Also, the sound distribution apparatus 1B includes a sound information generation unit 100, an encryption unit 110, a sound distribution unit 120, an apparatus communication unit 130, a force sense information generation unit 140, and the sound reproduction terminal 2B includes a terminal communication unit 200, a device attachment unit 210, a decoding unit 220, a sound reproduction unit 230, and the drive unit 260, and the authentication device 3 includes a device storage unit 300 and a connection unit 310.

In these configurations, the same reference numerals are given to substantially the same configurations as those described with reference to FIG. 2, and description thereof will be omitted.

(Sound Distribution Apparatus 1B)

The force sense information generation unit 140 generates force sense information to be distributed to the sound reproduction terminal 2B. Specifically, the force sense information generation unit 140 generates force sense information to be distributed to the sound reproduction terminal 2B on the basis of actions of a performer 11, vibration in a hall 10, a volume of cheers in the hall 10, a volume of a performance, or the like.

For example, the force sense information generation unit 140 may generate force sense information for allowing the user to simulate a feeling that his or her head is patted in a case in which the performer 11 acts as if the performer 11 patted on his or her head. The force sense information generation unit 140 may generate force sense information to deliver vibration in the hall 10 to the user. Furthermore, the force sense information generation unit 140 may generate force sense information to deliver vibration in accordance with cheers in the hall 10 or a volume of the performance to the user. In such a case, the user can further strongly feel the realistic sensations as if the user were in the hall 10.

(Sound Reproduction Terminal 2B)

The drive unit 260 drives on the basis of the force sense information. Specifically, the drive unit 260 delivers the force sense to the user by driving on the basis of the force sense information received from the sound distribution apparatus 1B. For example, the drive unit 260 may deliver the force sense that allows the user to feel as if the performer 11 patted on his or her head to the user. The drive unit 260 may deliver the vibration in the hall 10 as the force sense to the user, and may deliver the heat in the hall 10 to the user by vibrating in accordance with the volume of the cheers or the performance in the hall 10. The drive unit 260 may be various kinds of actuators such as an eccentric rotating motor, a voice coil motor, or a piezoelectric actuator.

The drive unit 260 may drive on the basis of the sound information that is received from the sound distribution apparatus 1B and is decoded by the decoding unit 220. Since the user can feel the vibration based on the sound information by their body in this case, the user can further strongly feel the realistic sensations.

The force sense information distributed from the sound distribution apparatus 1B may be output to the sound reproduction unit 230. In such a case, a user who does not hope the delivery of the force sense can notice that the force sense information has been distributed with sound. Since even the sound reproduction unit 230 can generate a force sense at a low frequency such as vibration, the sound reproduction terminal 2B that does not have the drive unit 260 can also deliver the force sense to the user by outputting the force sense information to the sound reproduction unit 230.

2.2 Operation Example of Sound Distribution System

Figure 6:
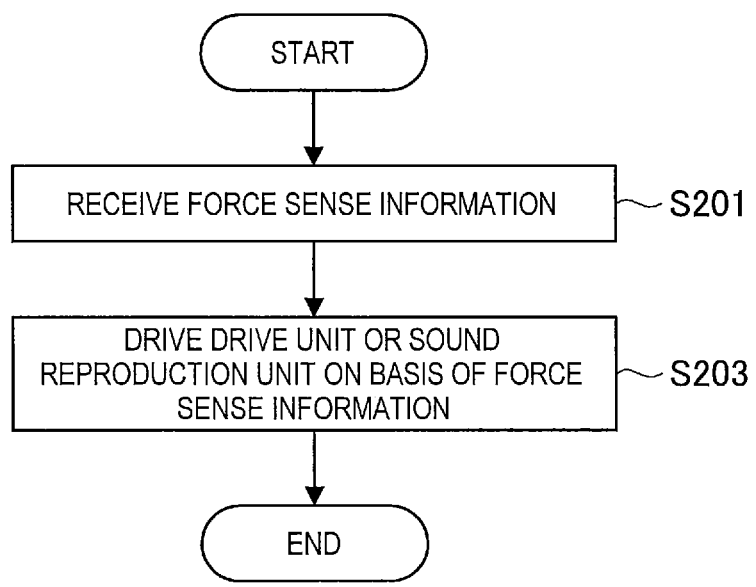
FIG. 6 is a flowchart illustrating an operation example of the sound distribution system according to the embodiment.

Next, an operation example of the sound distribution system according to the embodiment will be described with reference to FIG. 6. FIG. 6 is a flowchart illustrating an operation example of the sound distribution system according to the embodiment. In the following description, only operations related to delivery of the force sense to the user by the force sense information will be described.

As illustrated in FIG. 6, the terminal communication unit 200 in the sound reproduction terminal 2B receives force sense information generated in the force sense information generation unit 140 of the sound distribution apparatus 1B first (S201). Then, the drive unit 260 or the sound reproduction unit 230 drives on the basis of the received force sense information and delivers the force sense to the user (S203).

According to the sound distribution system of the embodiment as described above, since the sound distribution apparatus 1B can distribute the force sense information in addition to the sound information to the sound reproduction terminal 2B, it is possible to provide further strong realistic sensations to the user.

3. Third Embodiment 3.1 Configuration Example of Sound Distribution System

Figure 7:
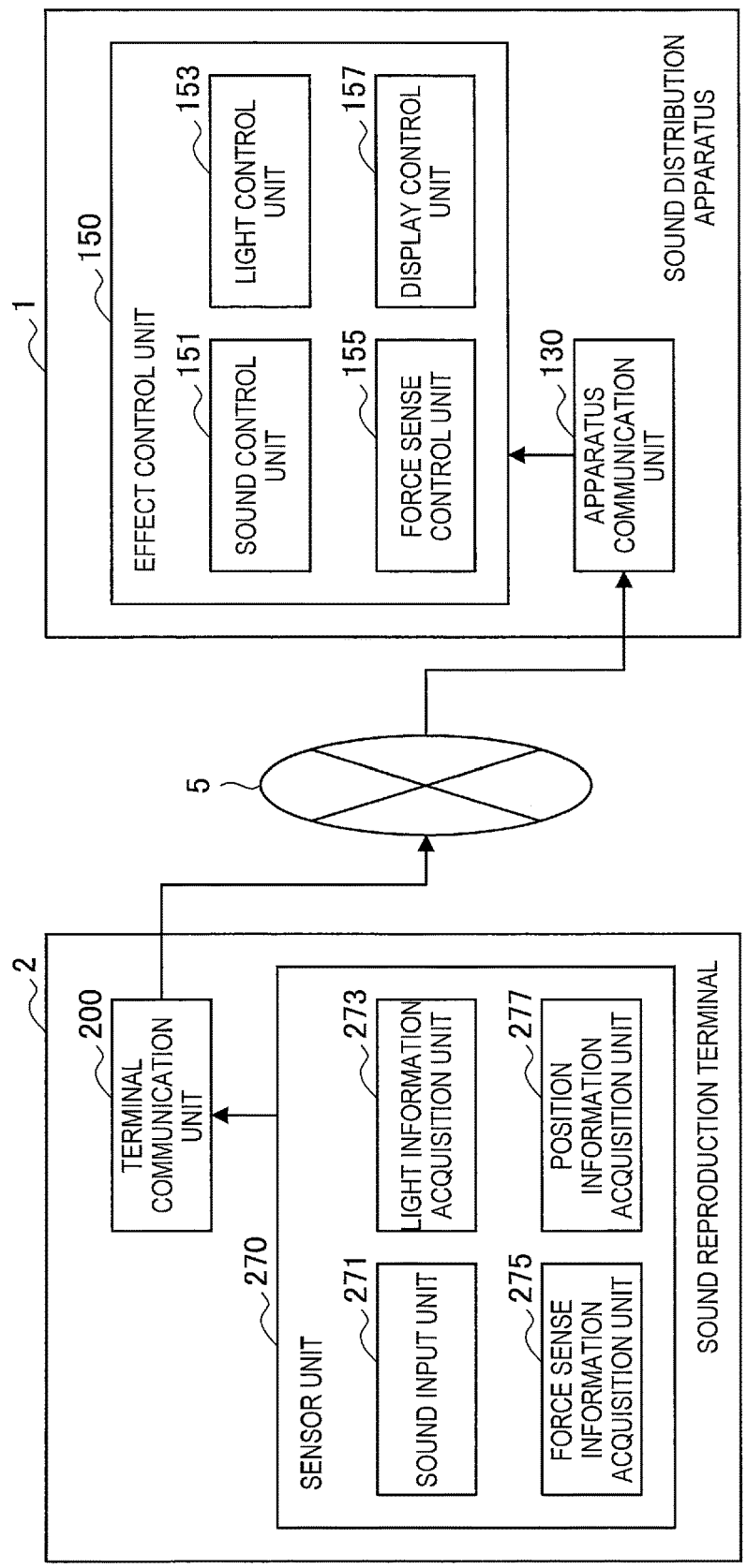
FIG. 7 is a block diagram illustrating a functional configuration related to information transmission from a sound reproduction terminal to a sound distribution apparatus in a sound distribution system according to a third embodiment of the present disclosure.

Next, a sound distribution system according to a third embodiment of the present disclosure will be described with reference to FIG. 7. The sound distribution system according to the embodiment includes a function of transmitting information from a sound reproduction terminal 2 to a sound distribution apparatus 1 and enables a bidirectional interaction between a user and a performer 11. FIG. 7 is a block diagram illustrating a functional configuration related to information transmission from the sound reproduction terminal 2 to the sound distribution apparatus 1 in the sound distribution system according to the embodiment.

Since the functional configuration of the authentication device 3 in the sound distribution system according to the embodiment is substantially the same as the configuration described with reference to FIG. 2, the description thereof will be omitted here. Although not illustrated in FIG. 7, it is needless to say that the sound distribution apparatus 1 and the sound reproduction terminal 2 have the functional configuration related to streaming distribution of the sound information as described above in the first or second embodiment.

As illustrated in FIG. 7, the sound distribution system according to the embodiment includes the sound distribution apparatus 1 and the sound reproduction terminal 2 that is connected to the sound distribution apparatus 1 via the network 5. The sound reproduction terminal 2 includes a terminal communication unit 200 and a sensor unit that includes a sound input unit 271, a light information acquisition unit 273, a force sense information acquisition unit 275, and a position information acquisition unit 277. The sound distribution apparatus 1 includes an apparatus communication unit 130 and an effect control unit that includes a sound control unit 151, a light control unit 153, a force sense control unit 155, and a display control unit 157.

(Sound Reproduction Terminal 2)

The sound input unit 271 is a microphone provided in the sound reproduction terminal 2, for example, receives a sound input from a user, and generates sound information. For example, the sound input unit 271 may collect sound of cheers of the user, calling of the performer 11 by the user, talking, and the like and convert the collected sound into the sound information.

The light information acquisition unit 273 acquires light information related to light from a light emitting tool that the user holds. Specifically, the light information acquisition unit 273 acquires light information including a color of light emitted by the light emitting tool, such as a pen light or a chemical light, which the user holds.

For example, the light information acquisition unit 273 may be an imaging device that determines a color of light from the light emitting tool, which the user holds, from an image capturing the light emitting tool that the user holds and generates the light information including the color of the light from the light emitting tool. Alternatively, the light information acquisition unit 273 may be a connection interface that allows external inputs, determines a color of light emitted from the light emitting tool in response to an information input from the light emitting tool that the user holds and generates the light information including the color of the light from the light emitting tool. In a case in which the light information acquisition unit 273 is an imaging device, the light information acquisition unit 273 may determine motion of the light emitting tool from an image capturing the light emitting tool that the user holds and generate light information that further includes information related to the motion of the light emitting tool.

The force sense information acquisition unit 275 generates force sense information to be fed back to a hall 10 where the performance takes place on the basis of an input from the user. Specifically, the force sense information acquisition unit 275 generates force sense information indicating what kind of a force sense is to be provided to either an object or the performer 11 that is present in the hall 10 where the performance takes place. Although a method of inputting the force sense information to the force sense information acquisition unit 275 from the user may be any method, examples thereof may include an input by an input device such as a switch, a sound input such as sound or applause, or an input by a user action.

The position information acquisition unit 277 acquires position information indicating the position of the sound reproduction terminal 2. For example, the position information acquisition unit 277 may be a global navigation satellite system (GNSS) sensor that acquire position information indicating the position of the sound reproduction terminal 2 by calculating the position of the sound reproduction terminal 2 from signals with time information transmitted from a plurality of satellites. The position information acquisition unit 277 may calculate the position of the sound reproduction terminal 2 by using an assisted global navigation satellite system (A-GNSS) that receives information that assists GNSS positioning from the network 5. Furthermore, the position information acquisition unit 277 may calculate the position of the sound reproduction terminal 2 by triangulation using a distance from a base station in a mobile communication network or a distance from a Wi-Fi (registered trademark) access point.

The terminal communication unit 200 is an interface for transmitting information related to various interactions (the sound information, the light information, the force sense information, the position information, and the like), which has been received by the sensor unit 270, to the sound distribution apparatus 1 via the network 5. The terminal communication unit 200 may be any interface as long as it can connect to the network 5. For example, the terminal communication unit 200 may be an antenna communication device that performs wireless communication by radio waves, a cable communication device that performs wired cable communication, or a communication device that supports wired or wireless LAN.

(Sound Distribution Apparatus 1)

The apparatus communication unit 130 is an interface for receiving information related to various interactions from the sound reproduction terminal 2 via the network 5. The apparatus communication unit 130 may be any interface as long as it can connect to the network 5. For example, the apparatus communication unit 130 may be an antenna communication apparatus that performs wireless communication by radio waves, a cable communication device that performs wired cable communication, or a communication device that supports wired or wireless LAN.

The sound control unit 151 controls sound reproduced at the hall 10 on the basis of the sound information received from each sound reproduction terminal 2. Specifically, the sound control unit 151 determines which of sound information is to be reproduced at the hall 10 from among the sound information received from each sound reproduction terminal 2 and reproduces the sound information, which is determined to be reproduced, by acoustic equipment such as a speaker in the hall 10. For example, the sound control unit 151 may control sound such that only cheers of the user is reproduced at the hall 10 in the sound information received from each sound reproduction terminal 2. In a case in which the user and the performer 11 have a short talk, the sound control unit 151 may control sound such that only sound information of the user who have the short talk is reproduced at the hall 10.

The light control unit 153 controls illumination equipment or a display device that is present in the hall 10 on the basis of the light information received from each sound reproduction terminal 2. Specifically, the light control unit 153 controls the illumination equipment and the display device such that the color of the light from the light emitting tool that the user of each sound reproduction terminal 2 holds is reflected to a color or display of the illumination equipment or the display device in the hall 10, on the basis of the light information received from each sound reproduction terminal 2. For example, the light control unit 153 may tally the color of the light from the light emitting tool that the user holds on the basis of the received light information and control the color or the display of the illumination equipment or the display device in the hall 10 such that the light has a color that is chosen by the largest number of light emitting tools as a result of the tally, on the basis of the received light information. The light control unit 153 may restart the tally of the color of the light from the light emitting tool that the user holds at predetermined timing (for example, at the time of starting a music piece in the performance).

In a case in which the light information received from each sound reproduction terminal 2 includes information related to motion of the light emitting tool that the user holds, the light control unit 153 may control motion of the illumination equipment or the display device of the hall 10 such that the motion of the light emitting tool that the user holds is reflected.

Furthermore, in a case in which the sound reproduction terminal 2 and the light emitting tool are connected to each other, the light control unit 153 may automatically change the color of the light from the light emitting tool. For example, the light control unit 153 may automatically change the color of the light from the light emitting tool on the basis of the sound information (a music piece, for example) distributed from the sound distribution apparatus 1, or may control the light emitting tool to emit a color of light, which corresponds to a favorite performer 11 of each user on the basis of the device identification information of the authentication device 3 attached to the sound reproduction terminal 2.

The force sense control unit 155 controls equipment in the hall 10 on the basis of the force sense information received from each sound reproduction terminal 2 and deliver a force sense to the object and the performer 11 that are present in the hall 10. Specifically, the force sense control unit 155 tallies the force sense information received from each sound reproduction terminal 2 and controls the equipment in the hall 10 such that a force sense in a form that a largest number of force sense information pieces indicate is delivered to a target that the largest number of force sense information pieces indicate as a result of the tally. For example, the force sense control unit 155 may deliver a force sense to the performer 11 by driving a drive device provided in a costume of the performer 11. The force sense control unit 155 may deliver a force sense to an object such as a balloon doll by controlling an air blower, a drive device, or the like provided in the hall 10. Furthermore, the force sense control unit 155 may converts the force sense information received from each sound reproduction terminal 2 into an image and causes the display device or the like in the hall 10 to display the image.

The display control unit 157 generates a map display indicating a position of the user who is viewing the performance by using each sound reproduction terminal 2 on the basis of the position information received from each sound reproduction terminal 2. For example, the display control unit 157 may generate display indicating a position that indicates the position information received from each sound reproduction terminal 2 with an image of a pin or the like on a map image on a plane or a three-dimensional spherical surface. The display control unit 157 may tally the position information received from each sound reproduction terminal 2 for a predetermined region (a nation, a prefecture, or a city) and generate display in which an image representing the number or the density of the sound reproduction terminals 2 in the predetermined region is superimposed on a map image on a plane or a three-dimensional spherical surface. The display control unit 157 may restart the tally of the position information received from each sound reproduction terminal 2 at a predetermined interval (every five minutes, for example).

Furthermore, in a case in which the device identification information has been acquired from the sound reproduction terminal 2, the display control unit 157 may change the display representing the position of the sound reproduction terminal 2 superimposed on the map image, on the basis of the device identification information. Specifically, the display control unit 157 may change the image representing the position of the sound reproduction terminal 2 to an icon unique to each user. Such an icon unique to each user is preferably registered in advance in association with the device identification information through a website by each user. Also, each user preferably further registers their own user information in association with the device identification information. In such a case, since a name and an icon of the user who is viewing the performance by using the sound reproduction terminal 2 are displayed on the map image generated by the display control unit 157, the possibility that the performer 11 or the audience 12 pays attention to the user increases. Therefore, the sound distribution system can provide a further enhanced special feeling to the user.

According to the configuration as described above, the sound distribution system according to the embodiment can realize bidirectional interactions between the user who is viewing the performance by using the sound reproduction terminal 2 and the performer 11 who is presenting the performance at the hall 10. Therefore, the sound distribution system according to the embodiment can provide further enhanced realistic sensations and a special feeling to the user who is viewing the performance by using the sound reproduction terminal 2.

3.2 Operation Examples of Sound Distribution System

Next, an operation example of the sound distribution system according to the embodiment will be described with reference to FIGS. 8 to 15. In the following description, operations of the sound distribution system according to the embodiment will be split into first to fourth operation examples in accordance with types of information transmitted from the sound reproduction terminal 2 to the sound distribution apparatus 1 and will be described.

3.2.1 First Operation Example

Figure 8:
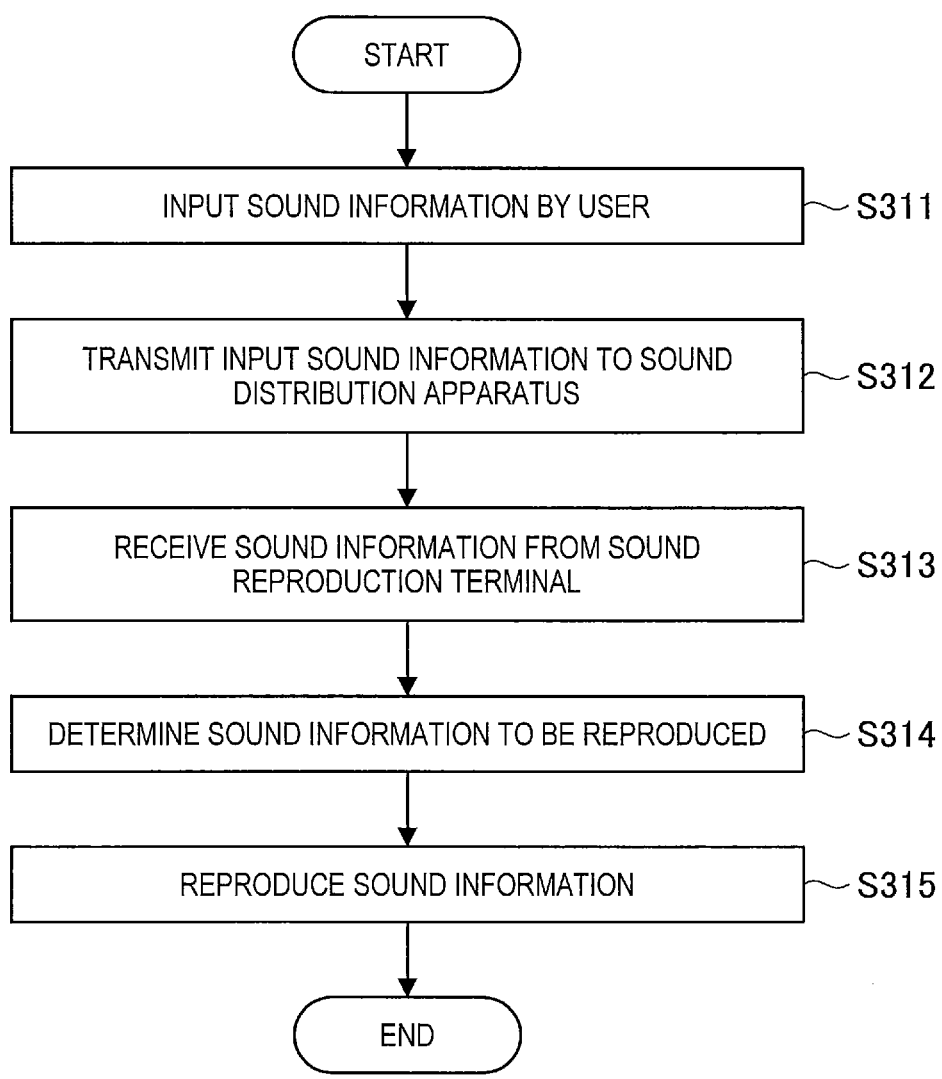
FIG. 8 is a flowchart illustrating a first operation example of the sound distribution system according to the embodiment.

First, the first operation example of the sound distribution system according to the embodiment will be described with reference to FIG. 8. FIG. 8 is a flowchart illustrating the first operation example of the sound distribution system according to the embodiment. The first operation example is an operation example in a case in which the sound reproduction terminal 2 transmits sound information to the sound distribution apparatus 1 and user has sound interactions with the hall 10.

As illustrated in FIG. 8, the user inputs sound information through the sound input unit 271 in the sound reproduction terminal 2 first (S311). Then, the terminal communication unit 200 transmits the sound information input through the sound input unit 271 to the sound distribution apparatus 1 (S312). Subsequently, the apparatus communication unit 130 receives the sound information from each sound reproduction terminal 2 (S313), and the sound control unit 151 determines the sound information to be reproduced from among the received sound information (S314), in the sound distribution apparatus 1. Furthermore, the sound control unit 151 reproduces the sound information by controlling a speaker or the like in the hall 10 (S315).

According to such operations, the sound distribution system according to the embodiment can reproduce at the hall 10 the sound information of the user who is viewing the performance by the sound reproduction terminal 2. Therefore, the sound distribution system according to the embodiment can provide enhanced realistic sensations to the user.

In this manner it is possible to hold a special talk event only for the user who is viewing the performance by using the sound reproduction terminal 2 before or after the performance, for example, and to have a talk or exchange greetings between the user and the performer 11. Such a talk between the user and the performer 11 may be stored as a memory in the storage unit or the like in the sound reproduction terminal 2.

3.2.2 Second Operation Example

Figure 9:
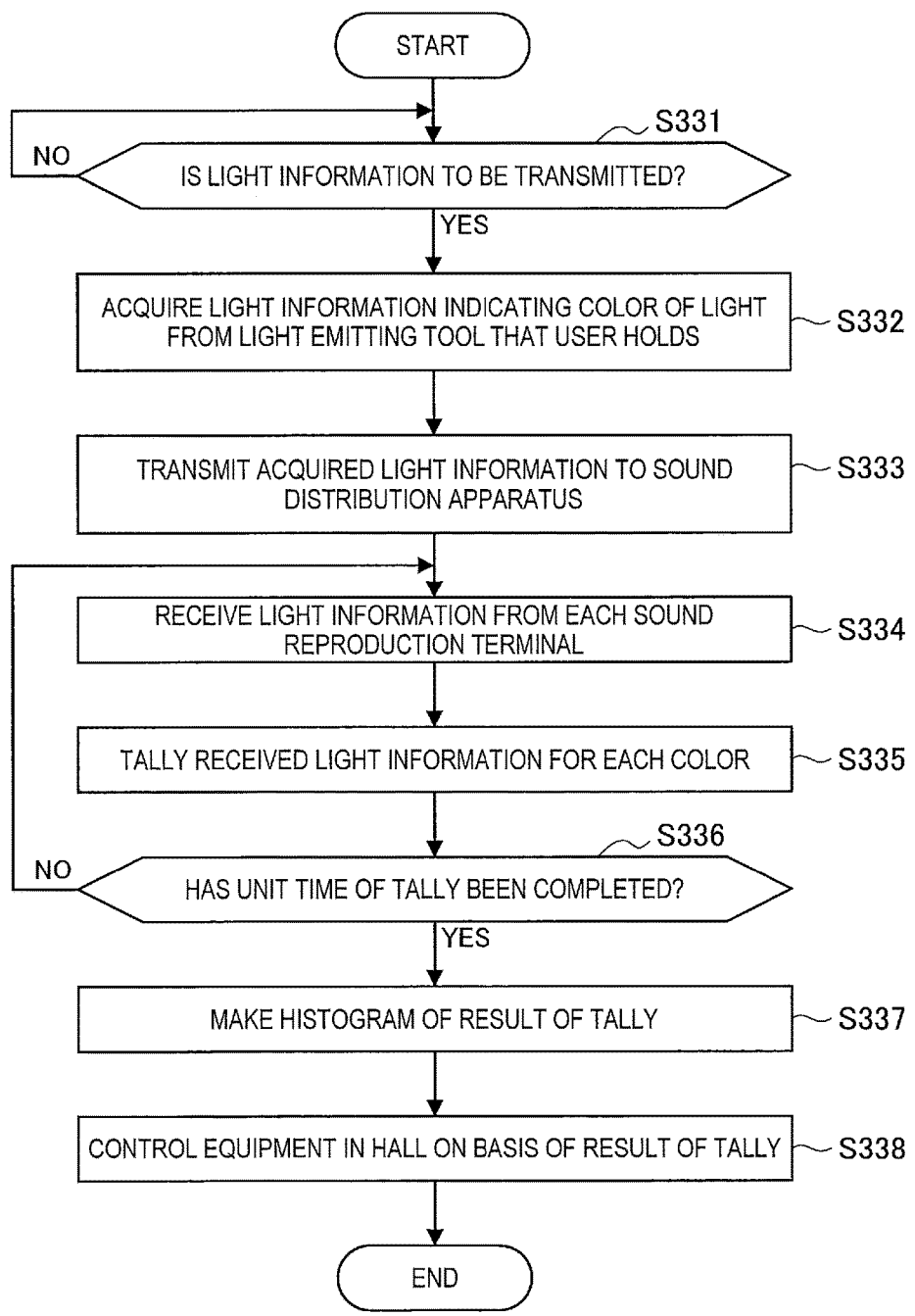
FIG. 9 is a flowchart illustrating a second operation example of the sound distribution system according to the embodiment.

Next, the second operation example of the sound distribution system according to the embodiment will be described with reference to FIG. 9. FIG. 9 is a flowchart illustrating the second operation example of the sound distribution system according to the embodiment. The second operation example is an operation example in a case in which the sound reproduction terminal 2 transmits light information to the sound distribution apparatus 1 and the user has light interactions with the hall 10.

As illustrated in FIG. 9, it is determined whether or not light information is to be transmitted to the user in the sound reproduction terminal 2 first (S331). In a case in which the user selects transmission of the light information (S331/Yes), the light information acquisition unit 273 acquires the light information including a color of light emitted from the light emitting tool such as a pen light or a chemical light that the user holds (S332). Next, the terminal communication unit 200 transmits the light information acquired by the light information acquisition unit 273 to the sound distribution apparatus 1 (S333). Then, the apparatus communication unit 130 receives the light information from each sound reproduction terminal 2 (S334), and the light control unit 153 tallies the received light information for each color of the light (S335), in the sound distribution apparatus 1. Here, the light control unit 153 determines whether or not a unit time of the tally has been completed (S336) and repeats the tally until the unit time of the tally is completed (S336/No). In a case in which the unit time of the tally has been completed (S336/Yes), the light control unit 153 makes histogram of the result of the tally (S337) and controls equipment such as the illumination equipment or the display device in the hall 10 on the basis of the result of the tally (S338).

According to such operations, the sound distribution system according to the embodiment can reflect the color of the light from the light emitting tool such as a pen light or the chemical light that the user who is viewing the performance by the sound reproduction terminal 2 holds to the illumination at the hall 10. Since staging arrangement by light is effectively used in many performances such as concerts and live performances, it is possible to further enhance the feeling that the user is participating in the performance according to such an operation example. Therefore, the sound distribution system according to the embodiment can provide further enhanced realistic sensations service to the user.

3.2.3 Third Operation Example

Figure 10:
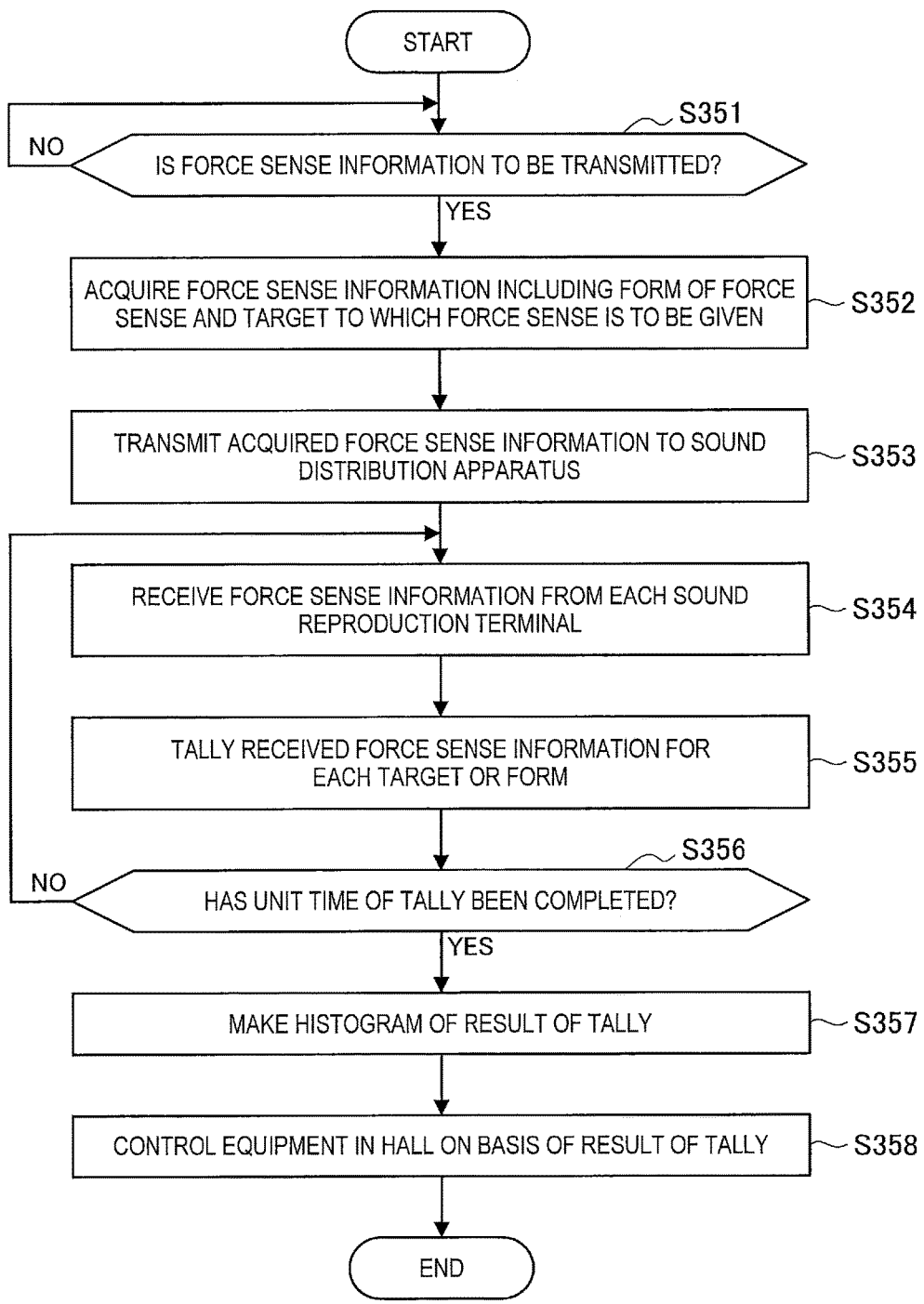
FIG. 10 is a flowchart illustrating a third operation example of the sound distribution system according to the embodiment.

Next, the third operation example of the sound distribution system according to the embodiment will be described with reference to FIG. 10. FIG. 10 is a flowchart illustrating the third operation example of the sound distribution system according to the embodiment. The third operation example is an operation example in a case in which the sound reproduction terminal 2 transmits force sense information to the sound distribution apparatus 1 and the user has force sense interactions with the hall 10.

As illustrated in FIG. 10, the sound reproduction terminal 2 checks whether or not force sense information is to be transmitted to the user first (S351). In a case in which the user selects the transmission of the force sense information (S351/Yes), the force sense information acquisition unit 275 the force sense information including a target to which the user is to give the force sense and a form of the force sense to be given (S352). Next, the terminal communication unit 200 transmits the force sense information acquired by the force sense information acquisition unit 275 to the sound distribution apparatus 1 (S353). Then, the apparatus communication unit 130 receives the force sense information from each sound reproduction terminal 2 (S354), and the force sense control unit 155 tallies the received force sense information for each target and for each form of the force sense (S355), in the sound distribution apparatus 1. Here, the force sense control unit 155 determines whether or not a unit time of the tally has been completed (S356) and repeats the tally until the unit time of the tally is completed (S356/No). In a case in which the unit time of the tally is completed (S356/Yes), the force sense control unit 155 makes a histogram of a result of the tally (S357) and controls equipment such as the drive device, the air blower, the display device, and the like in the hall 10 (S358) on the basis of the result of the tally.

According to such operations, the sound distribution system according to the embodiment can deliver the force sense interactions from the user who is viewing the performance by the sound reproduction terminal 2 to the hall 10. According to such a sound distribution system, it is possible to further enhance the feeling that the user is participating in the performance and to thereby improve realistic sensations of the user.

3.2.4 Fourth Operation Example

Figure 11:
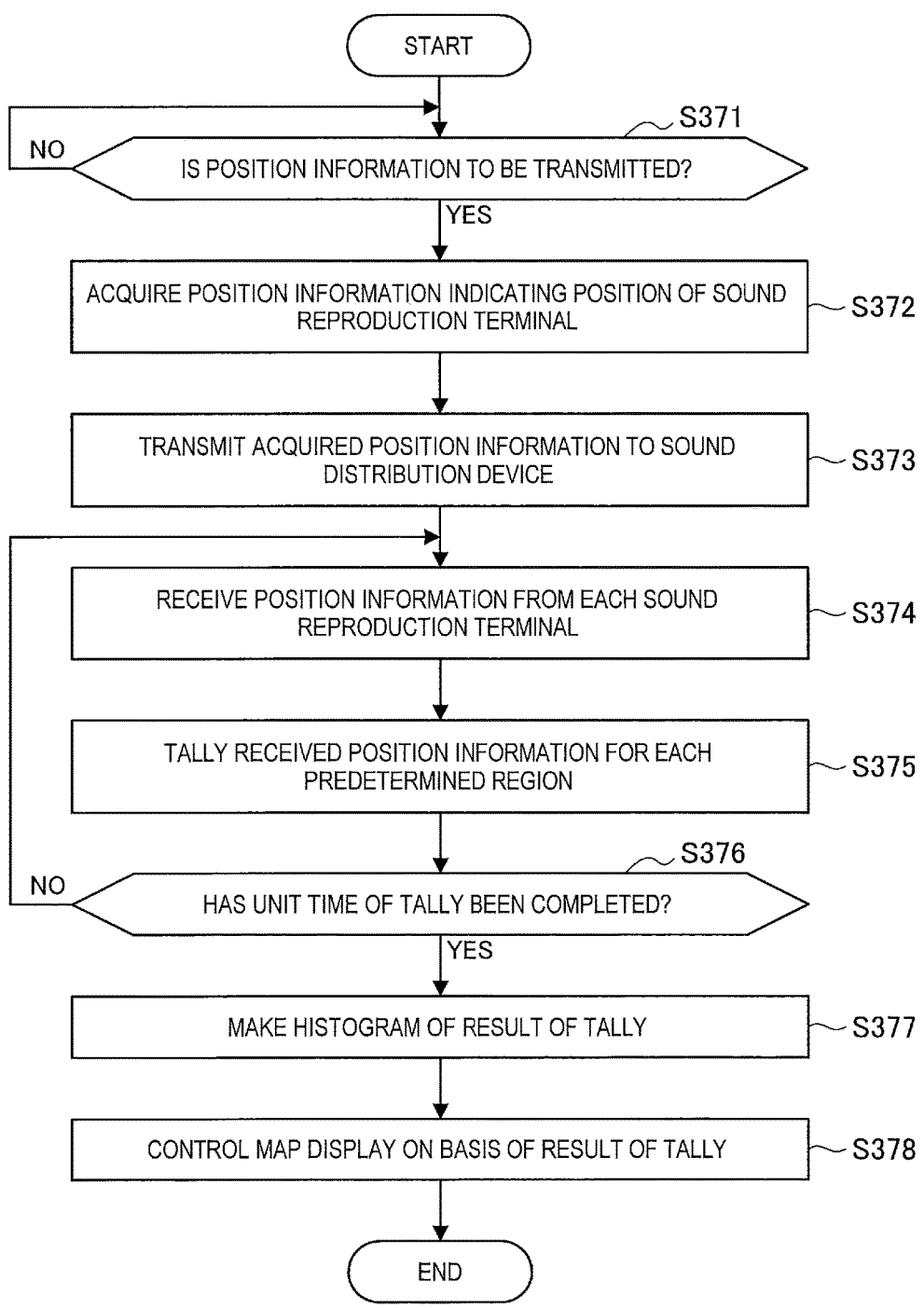
FIG. 11 is a flowchart illustrating a fourth operation example of the sound distribution system according to the embodiment.

Next, the fourth operation example of the sound distribution system according to the embodiment will be described with reference to FIGS. 11 to 15. FIG. 11 is a flowchart illustrating the fourth operation example of the sound distribution system according to the embodiment. FIGS. 12 to 15 are explanatory diagrams illustrating examples of map displays that are generated on the basis of received position information.

The fourth operation example is an operation example in which the presence of the user appeals at the hall by transmitting position information from the sound reproduction terminal 2 to the sound distribution apparatus 1 and generating display indicating the position of the user who is viewing the performance. The operation example of the sound distribution system described below is just an example, and operations of the sound distribution system according to the embodiment is not limited to the example illustrated in FIG. 11.

As illustrated in FIG. 11, the sound reproduction terminal 2 confirms the user whether or not to transmit position information first (S371). In a case in which the user selects transmission of the position information (S371/Yes), the position information acquisition unit 277 acquires the position information indicating the position of the sound reproduction terminal 2 (S372). Next, the terminal communication unit 200 transmits the position information acquired by the position information acquisition unit 277 to the sound distribution apparatus 1 (S373). Then, the apparatus communication unit 130 receives the position information from each sound reproduction terminal 2 (S374), and the display control unit 157 tallies the received position information for a predetermined region (S375), in the sound distribution apparatus 1. Here, the display control unit 157 determines whether or not a unit time of the tally has been completed (S376) and repeats the tally until the unit time of the tally is completed (S376/No). In a case in which the unit time of the tally has been completed (S376/Yes), the display control unit 157 makes a histogram of a result of the tally (S377), generates a map display indicating the position of the user who is viewing the performance on the basis of the result of the tally, and controls the map display on the display device at the hall 10 (S378). In a case in which the user is traveling, there is a possibility that the position of the sound reproduction terminal 2 varies. Therefore, it is preferable to repeatedly execute the tally of the position information at a predetermined time interval (about five minutes, for example).

Examples of the map displays generated by the display control unit 157 through such operations will be described in FIGS. 12 to 15.

Figure 12:
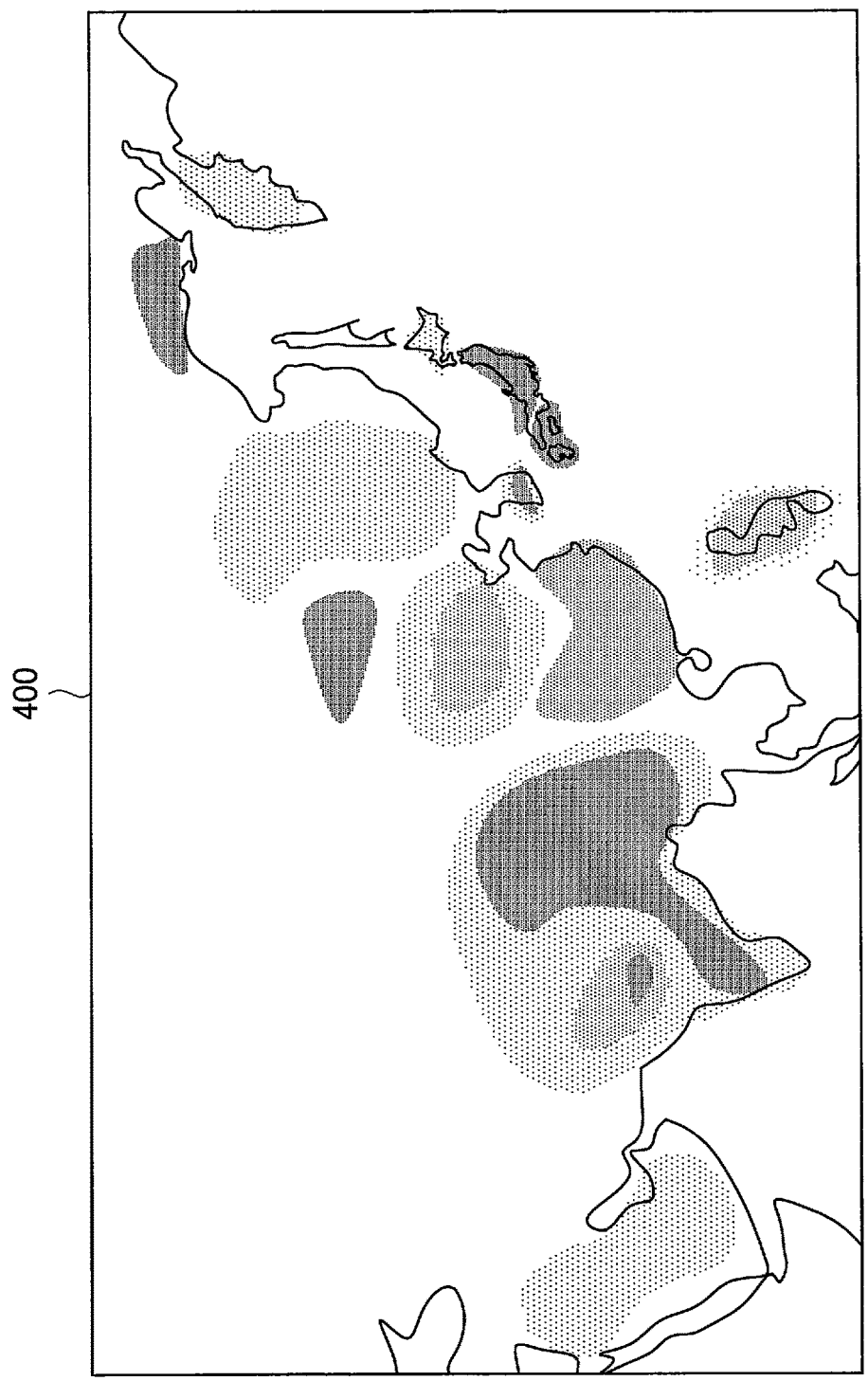
FIG. 12 is an explanatory diagram illustrating an example of map display generated on the basis of received position information.

For example, as illustrated in FIG. 12, the display control unit 157 may generate a map display 400 (a so-called heat map) that expresses density of users who are viewing a performance in each predetermined region (a nation, a prefecture, a city, or the like) with changes in a color grayscale or a color tone. According to such a map display 400, it is possible to visually clearly indicate distribution of the users who are viewing the performance in a wide range.

The color grayscale or the color tone in the map display 400 may change in response to sound or the like of the users who are viewing the performance in a corresponding region. For example, a region in which a large number of users who generates large sound and get excited are present, for example, may be displayed with a darker color.

Figure 13:
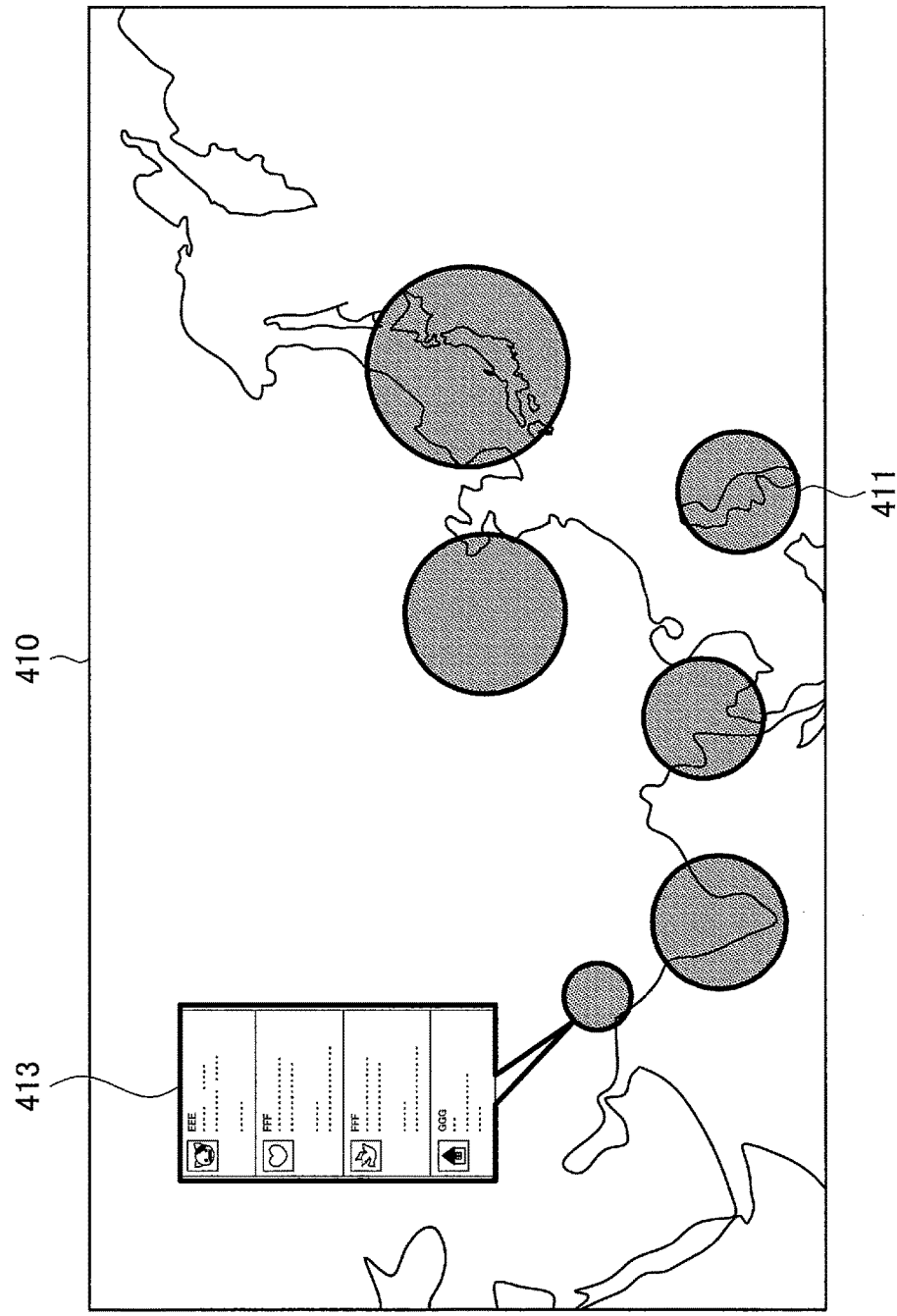
FIG. 13 is an explanatory diagram illustrating an example of map display generated on the basis of received position information.

As illustrated in FIG. 13, the display control unit 157 may generate a map display 410 that expresses the number of users who are viewing the performance in a predetermined region (a nation, a prefecture, a city, or the like) with a size of circular display 411.

In the map display 410, a list display 413 that displays individual user ions in a form of a list may be displayed in a popped up form from each circular display 411. At this time, users displayed in the list display 413 may be randomly selected from users who are present in a region of the popped-up list display 413 or may be selected in advance by lottery or the like. The user displayed on the list display 413 may be switched with elapse of time.

The list display 413 may be displayed in a popped-up manner from all the circular displays or may be displayed only circular displays 411 selected in the map display 410 by the performer 11 or the like. Each icon of the user displayed on the list display 413 is preferably registered in association with the device identification information in advance by each user through a website or the like.

Figure 14:
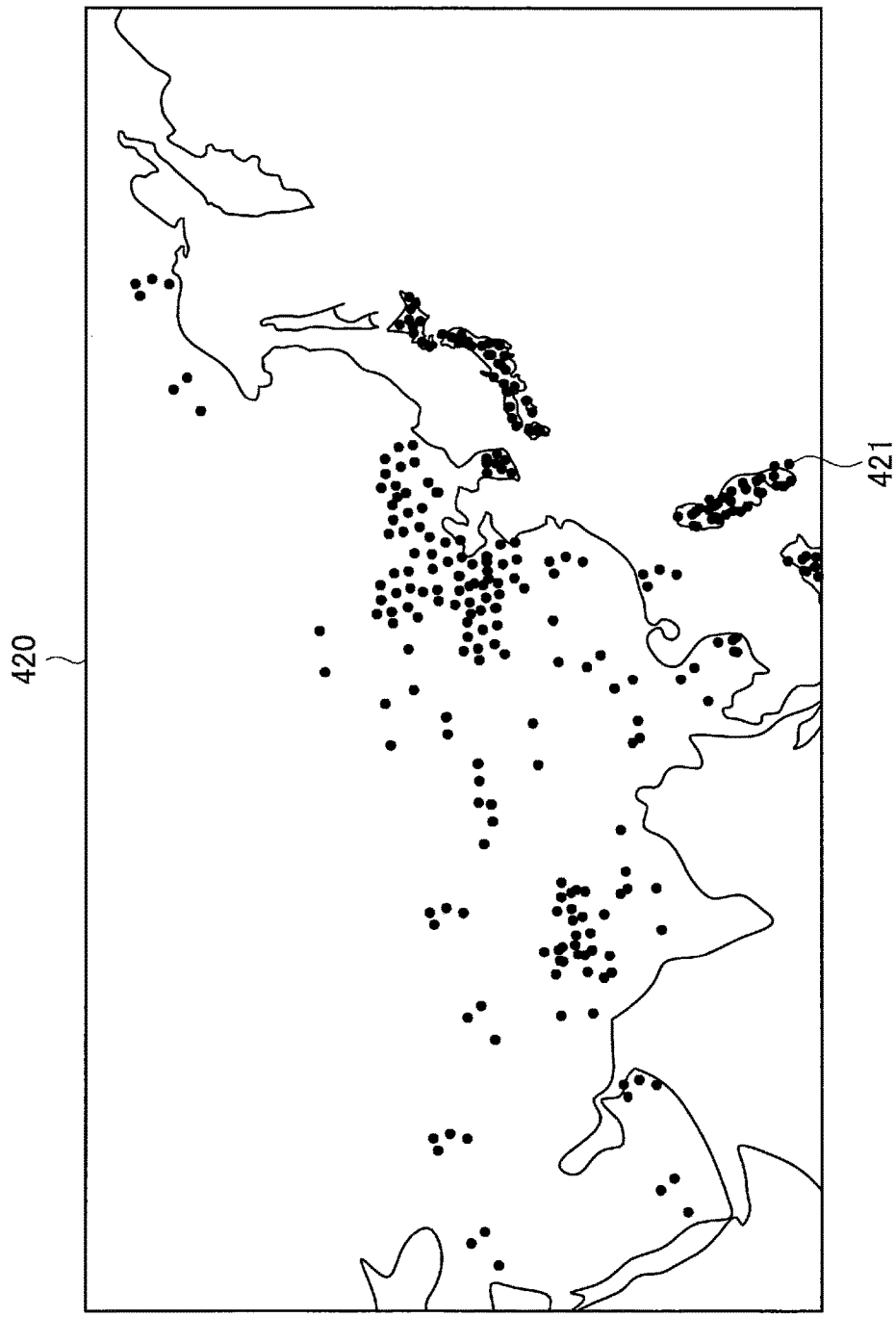
FIG. 14 is an explanatory diagram illustrating an example of map display generated on the basis of received position information.

As illustrated in FIG. 14, the display control unit 157 may generate a map display 420 that expresses each of users who are viewing a performance with a dot display 421. Since such a map display 420 can show the users who are viewing the performance as independent points to the hall 10 or the performer 11 according to such a map display 420, it is possible to provide a further enhanced special feeling to the user. Since an isolated dot display 421 at a remote place, an island, or the like has a high possibility that the hall 10 or the performer 11 pays attention thereto, it is possible to provide a further enhanced special feeling to the user corresponding to the isolated dot display 421.

Figure 15:
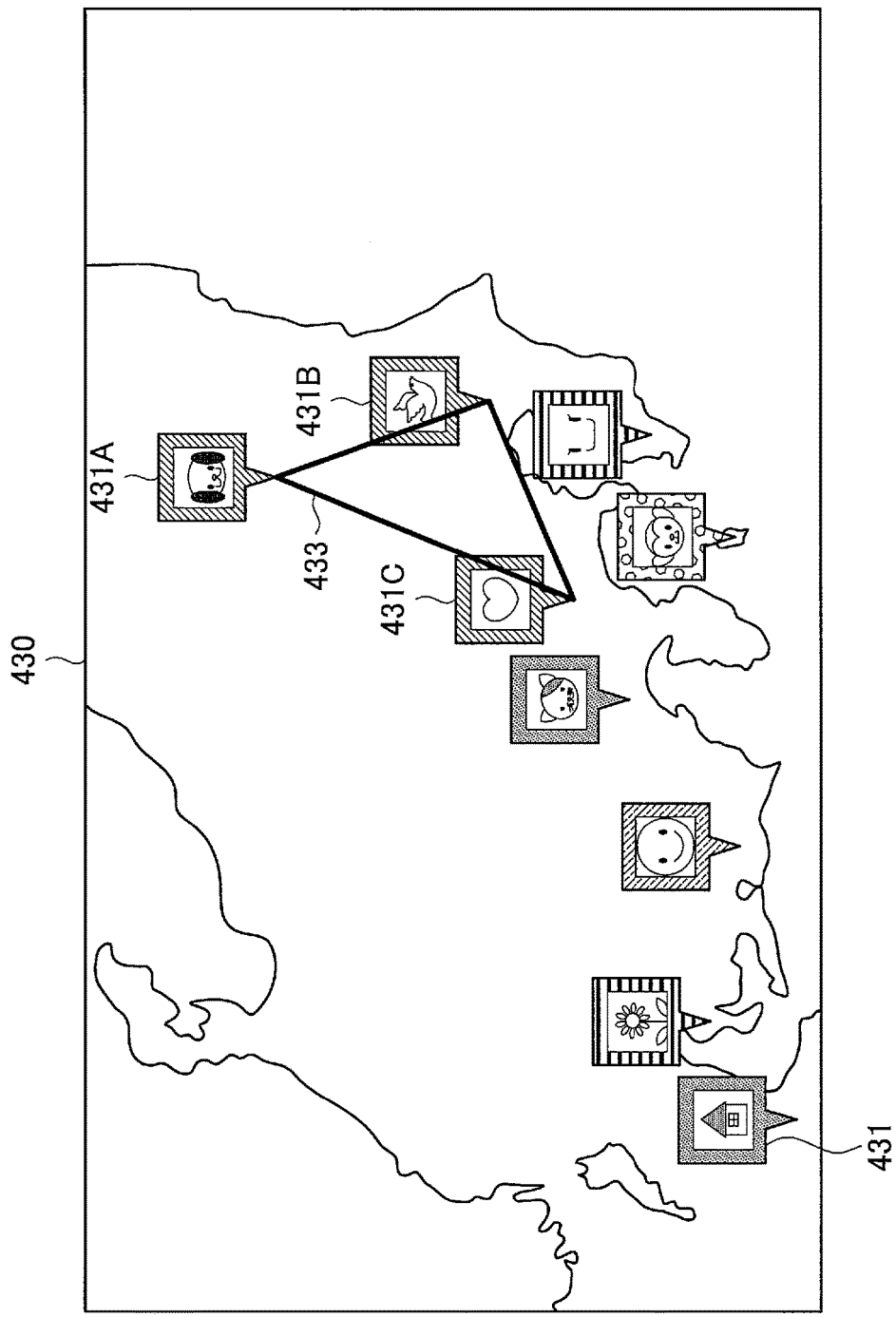
FIG. 15 is an explanatory diagram illustrating an example of map display generated on the basis of received position information.

As illustrated in FIG. 15, the display control unit 157 may generate a map display 430 that expresses users who are viewing a performance with image displays 431 of icons or the like. Such a map display 430 is more preferable in a case in which a narrower region is displayed.

Since such a map display 430 can show each of the users who are viewing the performance as the independent image display 431 to the hall 10 or the performer 11, it is possible to provide a further enhanced special feeling to the user. Since the user can appeal their individuality through the image display 431, the possibility that the hall 10 or the performer 11 pays attention thereto increases. The image display 431 that represents each user is preferably registered in association with the device identification information in advance by each user through a website or the like.

The image display 431 may be surrounded by a different frame color depending on the associated device identification information. In a case in which it is possible to identify a favorite performer 11 of each user by the device identification information, for example, the image display 431 may be surrounded by a different frame color depending on each favorite performer 11 of each user.

In a case in which the map display 430 that expresses the respective users with the individual image displays 431 is generated as described above, it is possible to closely connect the respective users to the performer 11. It is also possible to provide special services to the individual users. For example, it may provide a gift of a sound source or the like to a user of an image display 431 by the performer 11 or may provide a right to talk with the performer 11. A force sense as if the performer 11 patted the user on his or her head, for example, may be delivered to the user of the image display 431 selected by the performer 11. Furthermore, interactions of connecting a plurality of image displays 431A, 431B, and 431C with the line display 433 may be performed on the map display 430 by actions of the performer 11.

As described above, the sound distribution system can have closer interactions between the user and the performer 11 by using the map display that displays the position of the user who is viewing the performance. According to the sound distribution system of the embodiment, the position information received from the sound reproduction terminal 2 can be used for a user service. For example, the sound distribution system may provide a special message, a sound source, a gift, or the like to a user who is viewing the performance and is determined to have reached a specific region or a position, depending on the position information received from the sound reproduction terminal 2.

The sound distribution system according to the embodiment preferably stores the number and the content of interactions with the performer 11, information on dates and times of the interactions, position information of locations, and the like as log information for each user. According to such a configuration, the sound distribution system can save a user's memorable interaction with the performer 11 as a record. Here, a storage unit that stores the log information may be provided in the sound distribution apparatus 1 or may be provided in each sound reproduction terminal 2.

4. Hardware Configuration

Figure 16:
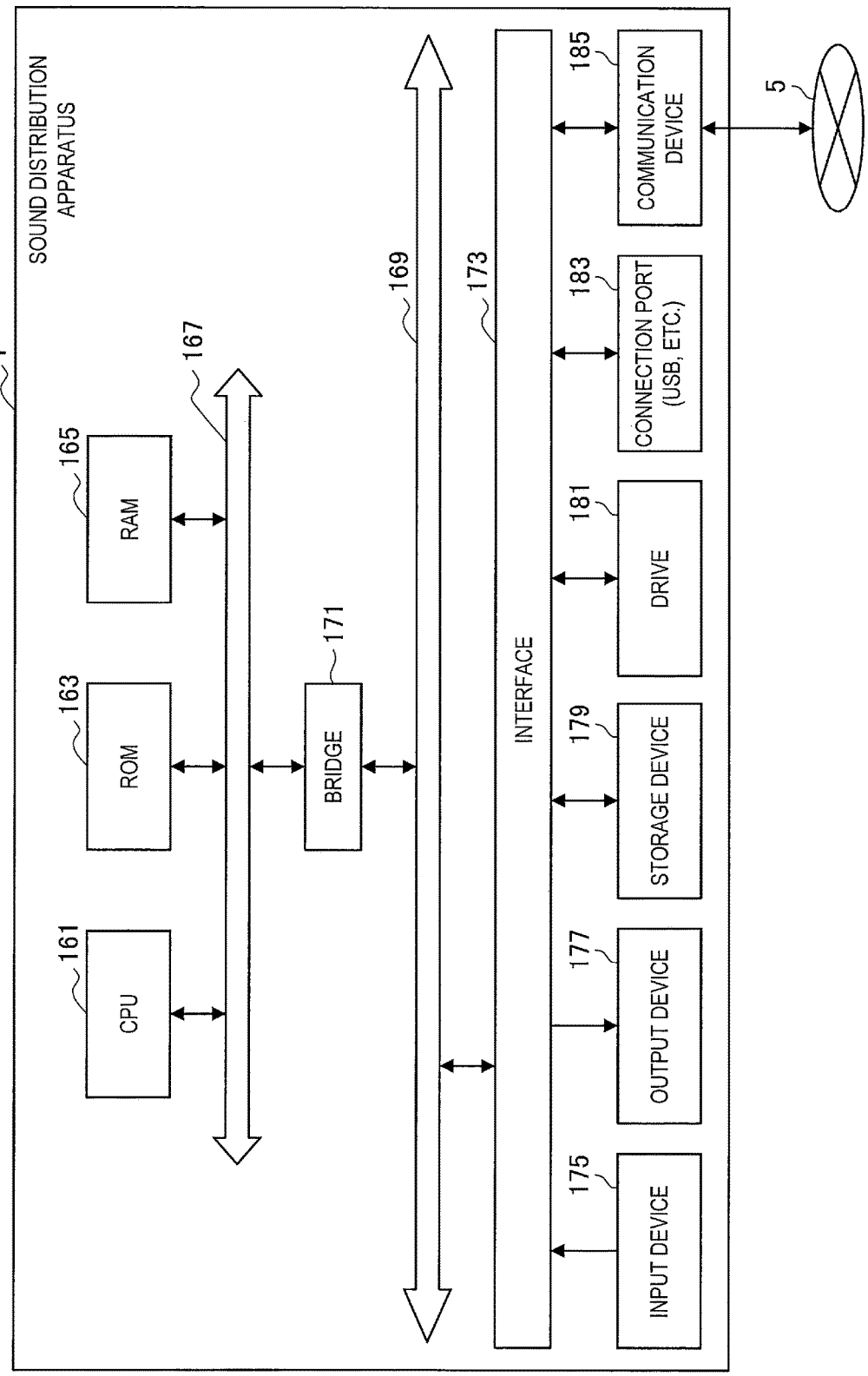
FIG. 16 is a block diagram illustrating a hardware configuration example of a sound distribution apparatus according to each embodiment of the present disclosure.

Hereinafter, a hardware configuration of the sound distribution apparatus 1 according to each embodiment of the present disclosure will be described with reference to FIG. 16. FIG. 16 is a block diagram illustrating a hardware configuration example of the sound distribution apparatus 1 according to each embodiment of the present disclosure. The information processing by the sound distribution apparatus 1 according to each embodiment of the present disclosure is realized by cooperation of software and hardware.

As illustrated in FIG. 16, the sound distribution apparatus 1 includes a central processing unit (CPU) 161, a read only memory (ROM) 163, a random access memory (RAM) 165, a bridge 171, internal buses 167 and 169, an interface 173, an input device 175, an output device 177, a storage device 179, a drive 181, a connection port 183, and a communication device 185.

The CPU 161 functions as an arithmetic processing device and a control device and controls overall operations of the sound distribution apparatus 1 in accordance with various programs stored in the ROM 163 and the like. The ROM 163 stores programs and arithmetic parameters used by the CPU 161, and the RAM 165 temporarily stores programs that is executed and used by the CPU 161 and parameters that appropriately change in the execution. For example, the CPU 161 may execute functions of the sound information generation unit 100, the encryption unit 110, the sound distribution unit 120, the force sense information generation unit 140, the effect control unit 150, and the like.

The information processing performed by the sound reproduction terminal 2 can be realized by the aforementioned hardware such as the CPU, the ROM, and the RAM cooperating with various kinds of software.

The CPU 161, the ROM 163, and the RAM 165 are connected to each other by the bridge 171, the internal buses 167 and 169, and the like. Also, the CPU 161, the ROM 163, and the RAM 165 are also connected to the input device 175, the output device 177, the storage device 179, the drive 181, the connection port 183, and the communication device 185 via the interface 173.

The input device 175 includes an input device, such as a touch panel, a keyboard, a button, a microphone, a switch, and a lever, through which information is input. The input device 175 also includes an input control circuit or the like that generates an input signal on the basis of input information and outputs the input signal to the CPU 161.

The output device 177 includes a display device such as a cathode ray tube (CRT) display device, a liquid crystal display device, or an organic electroluminescence (EL) display device and a sound output device such as a speaker and a headset.

The storage device 179 is a device for storing data that is formed as an example of a storage unit of the sound distribution apparatus 1. The storage device 179 may include a storage medium, a storage device that stores data in the storage medium, a reading device that reads data from the storage medium, and a deletion device that deletes the stored data.

The drive 181 is a reader/writer for a storage medium and is built in or externally attached to the sound distribution apparatus 1. For example, the drive 181 reads information that is stored in a removable storage medium, such as a magnetic disk, an optical disc, a magneto-optical disc, or a semiconductor memory, attached thereto and outputs the information to the RAM 163. Also, the drive 181 can write information in the removable storage medium.

The connection port 183 is a connection interface that is formed of a connection port for connecting external connection equipment such as a USB port or an optical audio terminal, for example.

The communication device 185 is a communication interface that is formed of a communication device for connecting to the network 5 such as a public line network, for example. The communication device 185 may be an antenna communication device that performs wireless communication by radio waves, a cable communication device that performs wired cable communication, or a communication device that supports wired or wireless LAN. For example, the communication device 185 may execute the function of the apparatus communication unit 130.

It is also possible to produce a computer program that causes the hardware, such as the CPU, the ROM, and the RAM, built in the sound distribution apparatus 1 to exhibit the same functions as those of the aforementioned respective configurations in the sound distribution apparatus 1. Also, a storage medium that stores the computer program therein is also provided.

5. Conclusion

According to the sound distribution system according to the embodiment of the present disclosure, it is possible to allow the user who cannot visit the hall 10 where the performance takes place to listen to the sound with sound quality that is as high as that in the hall 10 and to provide the similar realistic sensations as those at the hall 10 as described above.

According to the sound distribution system of an embodiment of the present disclosure, it is possible to limit users who can listen to the sound to users who have the authentication devices storing decoding information by streaming-distributing encrypted sound information. Therefore, the sound distribution system according to the embodiment of the present disclosure can simply control the listening of the sound by the users depending on whether the users have the authentication devices.

According to the sound distribution system of the embodiment of the present disclosure, it is possible to bidirectionally transmit and receive various kinds of information between the sound reproduction terminal 2 and the sound distribution apparatus 1 in addition to the distribution of sound information. According to such a sound distribution system, it is possible to establish bidirectional special interactions between the user and the performer 11.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the aforementioned embodiments have been described on the assumption that the sound distribution system distributes sound information, for example, the present technology is not limited to such an example. For example, the sound distribution system may distribute video information in addition to the sound information.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A sound distribution apparatus that is connected to a sound reproduction terminal that detachably holds an authentication device storing decoding information, the sound distribution apparatus including:

a sound distribution unit configured to streaming-distribute sound information, which has been encrypted with a decodable code on the basis of the decoding information, to the sound reproduction terminal.

(2)

The sound distribution apparatus according to (1), in which the sound information is sound information of a performance done by a performer.

(3)

The sound distribution apparatus according to (2), further including:

a sound control unit configured to control sound information to be reproduced at a hall where the performance takes place, on the basis of the sound information of a user which has been received from the sound reproduction terminal.

(4)

The sound distribution apparatus according to (2) or (3), further including:

a light control unit configured to control at least any of illumination equipment and display equipment at the hall where the performance takes place, on the basis of light information related to light of a light emitting tool that the user holds, which has been received from the sound reproduction terminal.

(5)

The sound distribution apparatus according to any one of (2) to (4), further including:

a force sense control unit configured to control a force sense that is provided to at least any of an object and the performer that are present at the hall where the performance takes place, on the basis of force sense information which has been received from the sound reproduction terminal.

(6)

The sound distribution apparatus according to any one of (2) to (5), further including:

a display control unit configured to control a map display indicating a position of each user of the sound reproduction terminal, on the basis of position information indicating the position of each of the sound reproduction terminals.

(7)

The sound distribution apparatus according to (6), in which the position information is associated with device identification information stored in the authentication device, and the display control unit controls the map display indicating the position of each user of the sound reproduction terminal with an icon associated with the device identification information.

(8)

The sound distribution apparatus according to (7), further including:

a force sense information generation unit configured to generate force sense information to drive a drive unit that is provided in the sound reproduction terminal of the user on the basis of an action of the performer with respect to the icons.

(9)

The sound distribution apparatus according to (7) or (8) in which the display control unit controls the icon in the map display on the basis of the device identification information.

(10)

The sound distribution apparatus according to (6), in which the display control unit tallies the positions of the respective users for each predetermined region and controls the map display indicating user distribution for each predetermined region.

(11)

The sound distribution apparatus according to any one of (6) to (10), in which the display control unit controls the map display further on the basis of various kinds of information that is received from the respective sound reproduction terminals in association with the position information.

(12)

The sound distribution apparatus according to claim 1, in which sound included in the sound information is selectable by the user of the sound reproduction terminal.

(13)

The sound distribution apparatus according to any one of (1) to (12), in which sound included in the sound information is controlled on the basis of device identification information stored in the authentication device.

(14)

The sound distribution apparatus according to any one of (1) to (13), in which the sound information is reproducible only by the sound reproduction terminal.

(15)

A sound reproduction terminal that is connected to a sound distribution apparatus that streaming-distributes encrypted sound information, the sound reproduction terminal including:

a device attachment unit configured to detachably hold an authentication device storing decoding information for decoding the encrypted sound information;

a decoding unit configured to decode the encrypted sound information on the basis of the decoding information acquired from the authentication device; and a sound reproduction unit configured to streaming-reproduce the decoded sound information.

(16)

The sound reproduction terminal according to (15), further including:

a drive unit configured to drive on the basis of force sense information, which has been received from the sound distribution apparatus.

(17)

The sound reproduction terminal according to (15) or (16), further including:

an encryption unit configured to acquire encryption information corresponding to the decoding information from the authentication device and encrypt a part of the sound information to be reproduced with the encryption information; and an encryption storage unit that stores the encrypted sound information.

(18)

An authentication device that stores decoding information for decoding sound information that is streaming-distributed from a sound distribution apparatus, is the authentication device being detachably held by a sound reproduction terminal that streaming-reproduces the decoded sound information.

(19)

A sound distribution system including:

a sound reproduction terminal including a device attachment unit configured to detachably hold an authentication device storing decoding information for decoding encrypted sound information, a decoding unit configured to decode the encrypted sound information on the basis of the decoding information acquired from the authentication device, and a sound reproduction unit configured to streaming-reproduce the decoded sound information; and a sound distribution apparatus including a sound distribution unit configured to streaming-distribute the encrypted sound information to the sound reproduction terminal.

(20)

A sound distribution method including:

connecting to a sound reproduction terminal configured to detachably hold an authentication device storing decoding information;

encrypting sound information with a decodable code on the basis of the decoding information stored in the authentication device by using an arithmetic processing device; and streaming-distributing the encrypted sound information to the sound reproduction terminal.

REFERENCE SIGNS LIST 1 sound distribution apparatus
2 sound reproduction terminal
3 authentication device
100 sound information generation unit
110 encryption unit
120 sound distribution unit
130 apparatus communication unit
140 force sense information generation unit
151 sound control unit
153 light control unit
155 force sense control unit
157 display control unit
200 terminal communication unit
210 device attachment unit
220 decoding unit
230 sound reproduction unit
240 terminal encryption unit
250 terminal storage unit
260 drive unit
271 sound input unit
273 light information acquisition unit
275 force sense information acquisition unit
277 position information acquisition unit
300 device storage unit
310 connection unit

The invention claimed is:

1. A sound distribution apparatus, the sound distribution apparatus comprising:

a sound distribution unit configured to streaming-distribute sound information to a sound reproduction terminal connected to the sound distribution apparatus, wherein the sound information is encrypted with a decodable code based on decoding information stored in an authentication device detachably connected to the sound reproduction terminal, and wherein the sound information corresponds to a sound of a performance done by a performer; and a sound control unit configured to control the sound information to be reproduced at a hall where the performance takes place, wherein the sound information is controlled based on user sound information received from the sound reproduction terminal.

2. The sound distribution apparatus according to claim 1, further comprising:

a light control unit configured to control at least one of an illumination equipment or a display equipment at the hall where the performance takes place, based on light information related to light of a user held light emitting tool, wherein the light information is received from the sound reproduction terminal.

3. The sound distribution apparatus according to claim 1, further comprising:

a force sense control unit configured to control a force sense provided to at least one of an object or the performer present at the hall where the performance takes place, wherein the force sense is controlled based on force sense information received from the sound reproduction terminal.

4. The sound distribution apparatus according to claim 1, further comprising:

a display control unit configured to generate a map display indicating a position of a user of the sound reproduction terminal, wherein the map display is generated based on position information received from the sound reproduction terminal.

5. The sound distribution apparatus according to claim 4, wherein the position information is associated with device identification information stored in the authentication device, and the display control unit is further configured to change the map display indicating the position of the user of the sound reproduction terminal based on the device identification information.

6. The sound distribution apparatus according to claim 5, wherein the display control unit is further configured to:

display the position of the user of the sound reproduction terminal based on an icon in the map display; and control the icon in the map display based on the device identification information.

7. The sound distribution apparatus according to claim 4, wherein the display control unit is further configured to:

tally positions of a plurality of users for a region; and control the map display to indicate a user distribution for the region.

8. The sound distribution apparatus according to claim 4, wherein the display control unit is further configured to control the map display based on various kinds of information received from the sound reproduction terminal in association with the position information.

9. The sound distribution apparatus according to claim 1, further comprising:

a force sense information generation unit configured to generate force sense information based on an action of the performer, wherein the generated force sense information is used to drive a drive unit of the sound reproduction terminal.

10. The sound distribution apparatus according to claim 1, wherein the sound included in the sound information is selectable by a user of the sound reproduction terminal.

11. The sound distribution apparatus according to claim 1, further comprising a sound information generation unit configured to control the sound included in the sound information based on device identification information stored in the authentication device.

12. The sound distribution apparatus according to claim 1, wherein the sound information is reproducible only by the sound reproduction terminal.

13. A sound reproduction terminal, the sound reproduction terminal comprising:
  a device attachment unit configured to detachably hold an authentication device that stores decoding information to decode an encrypted sound information,
  wherein the encrypted sound information is distributed by a sound distribution apparatus connected to the sound reproduction terminal;
  a decoding unit configured to decode the encrypted sound information based on the decoding information acquired from the authentication device;
  a sound reproduction unit configured to streaming-reproduce the decoded sound information; and
  a drive unit configured to be driven based on force sense information received from the sound distribution apparatus.

14. The sound reproduction terminal according to claim 13, further comprising:
  an encryption unit configured to:
    acquire encryption information corresponding to the decoding information from the authentication device; and
    encrypt a part of sound information to be reproduced based on the encryption information; and
  an encryption storage unit configured to store the encrypted part of the sound information.

15. An authentication device configured to:
  store decoding information to decode sound information streaming-distributed from a sound distribution apparatus; and
  detachably connect to a sound reproduction terminal that streaming-reproduces the decoded sound information,
  wherein the sound distribution apparatus controls the sound information to be reproduced at a hall where a performance takes place, and
  wherein the sound information is controlled based on user sound information received from the sound reproduction terminal.

16. A sound distribution system, comprising:
  a sound reproduction terminal including:
    a device attachment unit configured to detachably hold an authentication device that stores decoding information to decode an encrypted sound information;
    a decoding unit configured to decode the encrypted sound information based on the decoding information acquired from the authentication device; and
    a sound reproduction unit configured to streaming-reproduce the decoded sound information; and
  a sound distribution apparatus including:
    a sound distribution unit configured to streaming-distribute the encrypted sound information to the sound reproduction terminal; and
    a sound control unit configured to control the encrypted sound information to be reproduced at a hall where a performance takes place,
    wherein the encrypted sound information is controlled based on user sound information received from the sound reproduction terminal.

17. A sound distribution method, comprising:
  in a sound distribution apparatus:
    connecting to a sound reproduction terminal configured to detachably hold an authentication device storing decoding information;
    encrypting sound information with a decodable code based on the decoding information stored in the authentication device;
    streaming-distributing the encrypted sound information to the sound reproduction terminal; and
    controlling the encrypted sound information to be reproduced at a hall where a performance takes place,
    wherein the encrypted sound information is controlled based on user sound information received from the sound reproduction terminal.

18. A headphone apparatus, the headphone apparatus comprising:
  a device attachment unit configured to detachably hold an authentication device that stores decoding information to decode an encrypted sound information,
  wherein the encrypted sound information is distributed by a sound distribution apparatus wirelessly connected to the headphone apparatus;
  a drive unit configured to be driven based on force sense information received from the sound distribution apparatus; and
  circuitry configured to:
    decode the encrypted sound information based on the decoding information acquired from the authentication device; and
    streaming-reproduce the decoded sound information.

* * * * *